(12) United States Patent
Kawaue

(10) Patent No.: US 10,676,636 B2
(45) Date of Patent: Jun. 9, 2020

(54) BRUSH COMPOSITION, AND METHOD OF PRODUCING STRUCTURE CONTAINING PHASE-SEPARATED STRUCTURE

(71) Applicant: TOKYO OHKA KOGYO CO., LTD., Kawasaki-shi (JP)

(72) Inventor: Akiya Kawaue, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 114 days.

(21) Appl. No.: 15/924,772

(22) Filed: Mar. 19, 2018

(65) Prior Publication Data

US 2018/0273794 A1  Sep. 27, 2018

(30) Foreign Application Priority Data

Mar. 23, 2017 (JP) .................. 2017-057366

(51) Int. Cl.
*B05D 1/00* (2006.01)
*B05D 3/02* (2006.01)
(Continued)

(52) U.S. Cl.
CPC ........... *C09D 165/00* (2013.01); *B05D 1/005* (2013.01); *B05D 3/0254* (2013.01); *B05D 3/107* (2013.01);
(Continued)

(58) Field of Classification Search
CPC .. C09D 165/00; C09D 153/00; C09D 125/06; C08F 297/042; C08F 112/08; C08G 81/022; C08G 61/04; C08G 81/021; C08G 2261/126; C08G 83/008; C08G 2261/1412; C08G 2261/2261; C08G 2261/124; C08G 2261/1422; C08G 2261/148; C08G 2261/228; B05D 1/005; B05D 3/0254; B05D 3/107; B05D 7/50; B05D 7/52; B05D 2201/00; B05D 2201/02; B05D 2202/00;
(Continued)

(56) References Cited

U.S. PATENT DOCUMENTS

2013/0243958 A1* 9/2013 Senzaki ................. C09J 133/06
427/264

FOREIGN PATENT DOCUMENTS

JP  A-2008-036491  2/2008

OTHER PUBLICATIONS

In, I.; La, Y.-H.; Park, S.-M.; Nealey, P. F.; Gopalan, P. Side-Chain-Grafted Random Copolymer Brushes as Neutral Surfaces for Controlling the Orientation of Block Copolymer Microdomains in Thin Films. Langmuir 2006, 22 (18), 7855-7860. (Year: 2006).*

(Continued)

*Primary Examiner* — William P Fletcher, III
(74) *Attorney, Agent, or Firm* — Knobbe, Martens, Olson & Bear LLP

(57) ABSTRACT

A method of producing a structure containing a phase-separated structure, the method including: applying a brush composition to a substrate to form a brush layer; forming a layer containing a block copolymer on the brush layer; and phase-separating the layer containing the block copolymer, the brush composition including a resin component (A), the resin component (A) containing a polymeric compound (A1) in which a first polymer block and a second polymer block are bonded to each other through a linking group containing a substrate adhering group.

7 Claims, 2 Drawing Sheets

(51) Int. Cl.
*B05D 3/10* (2006.01)
*B05D 7/00* (2006.01)
*C09D 165/00* (2006.01)
*C08G 61/04* (2006.01)
*C08F 297/04* (2006.01)
*C08G 81/02* (2006.01)
*C09D 153/00* (2006.01)
*C09D 125/06* (2006.01)
*C08F 112/08* (2006.01)
*C08G 83/00* (2006.01)

(52) U.S. Cl.
CPC ............ *B05D 7/52* (2013.01); *C08F 112/08* (2013.01); *C08F 297/042* (2013.01); *C08G 61/04* (2013.01); *C08G 81/022* (2013.01); *C09D 125/06* (2013.01); *C09D 153/00* (2013.01); *B05D 2201/00* (2013.01); *B05D 2201/02* (2013.01); *B05D 2202/00* (2013.01); *B05D 2202/20* (2013.01); *B05D 2202/25* (2013.01); *B05D 2202/30* (2013.01); *B05D 2202/35* (2013.01); *B05D 2202/45* (2013.01); *B05D 2203/30* (2013.01); *B05D 2203/35* (2013.01); *B05D 2502/005* (2013.01); *B05D 2507/005* (2013.01); *C08G 81/021* (2013.01); *C08G 83/008* (2013.01); *C08G 2261/124* (2013.01); *C08G 2261/126* (2013.01); *C08G 2261/148* (2013.01); *C08G 2261/1412* (2013.01); *C08G 2261/1422* (2013.01); *C08G 2261/228* (2013.01)

(58) Field of Classification Search
CPC ............ B05D 2202/20; B05D 2202/25; B05D 2202/30; B05D 2202/35; B05D 2202/40; B05D 2202/45; B05D 2203/30; B05D 2203/35; B05D 2502/005; B05D 2507/005
See application file for complete search history.

(56) References Cited

OTHER PUBLICATIONS

Ryu, D. Y. A Generalized Approach to the Modification of Solid Surfaces. Science 2005, 308 (5719), 236-239. (Year: 2005).*
Farrell, R.; Fitzgerald, T.; Borah, D.; Holmes, J.; Morris, M. Chemical Interactions and Their Role in the Microphase Separation of Block Copolymer Thin Films. International Journal of Molecular Sciences 2009, 10 (9), 3671-3712. (Year: 2009).*
Hinsberg et al., "Self-Assembling Materials for Lithographic Patterning: Overview, Status and Moving Forward", Proceedings of SPIE, vol. 7637, 76370G-1 to 76370G-11, 2010.

* cited by examiner

BRUSH COMPOSITION, AND METHOD OF PRODUCING STRUCTURE CONTAINING PHASE-SEPARATED STRUCTURE

TECHNICAL FIELD

The present invention relates to a brush composition, and a method of producing a structure containing a phase-separated structure.

Priority is claimed on Japanese Patent Application No. 2017-057366, Mar. 23, 2017, the content of which is incorporated herein by reference.

DESCRIPTION OF RELATED ART

Recently, as further miniaturization of large scale integrated circuits (LSI) proceeds, a technology for processing a more delicate structure is demanded. In response to such demand, technical developments have been conducted on forming a fine structure using a phase-separated structure formed by self-assembly of block polymers having mutually incompatible blocks bonded together.

For using a phase separation of a block copolymer, it is necessary to form a self-organized nano structure by a microphase separation only in specific regions, and arrange the nano structure in a desired direction.

For realizing position control and orientational control of such self-assembled structure, methods such as graphoepitaxy to control phase-separated pattern by a guide pattern and chemical epitaxy to control phase-separated pattern by difference in the chemical state of the substrate are proposed (see, for example, Non-Patent Document 1).

As a method of phase-separating a block copolymer to form a fine pattern, for example, there is disclosed a method in which a brush layer (undercoat layer) having a surface free energy of a mean value of the surface free energy of 2 block chains is formed on a substrate, such that the face of the substrate contacting the block copolymer has a surface free energy of a mean value of the surface free energy of 2 block chains (for example, see Patent Literature 1). By forming such a brush layer on the substrate, the face of the substrate contacting the block copolymer has a surface free energy of a mean value of the surface free energy of 2 block chains. In this manner, patterns of various shapes with smaller sizes can be formed as compared to conventional lithography properties.

DOCUMENTS OF RELATED ART

Patent Literature

[Patent Document 1] Japanese Unexamined Patent Application, First Publication No. 2008-36491

Non-Patent Documents

[Non-Patent Document 1] Proceedings of SPIE (U.S.), vol. 7637, pp. 76370G-1 (2010)

SUMMARY OF THE INVENTION

For preventing agglomeration of the brush layer, there may be considered a method in which the baking after the coating is conducted at a temperature lower than the range of about 250° C. to 280° C. However, when the baking is conducted at a low temperature, the contact angle of the surface of the brush layer with respect to water becomes unsatisfactory. Further, there may also be considered a method in which the molecular weight of the polymeric compound contained in the brush composition is increased. However, in this method, the film thickness of the brush layer becomes large.

In general, a brush layer is formed by applying a brush composition to a substrate, and then a bake treatment at a temperature as high as about 250° C. to 280° C. As a result of the studies of the present inventor, it has been found that there was a problem of the formed brush layer agglomerating during the baking process.

The present invention takes the above circumstances into consideration, with an object of providing a brush composition which is capable of reducing agglomeration by high temperature baking after being coated on a substrate, and enabling formation of a thin film brush layer; and a method of forming a structure containing a phase-separated structure using the same.

A first aspect of the present invention is a brush composition usable for phase-separation of a layer containing a block copolymer formed on a substrate, the brush composition including a resin component (A), the resin component (A) containing a polymeric compound (A1) in which a first polymer block and a second polymer block are bonded to each other through a linking group containing a substrate adhering group.

A second aspect of the present invention is a method of producing a structure containing a phase-separated structure, the method including: a step of applying the brush composition of the first aspect to a substrate to form a brush layer; a step of forming a layer containing a block copolymer on the brush layer; and a step of phase-separating the layer containing the block copolymer.

In the present description and claims, the term "aliphatic" is a relative concept used in relation to the term "aromatic", and defines a group or compound that has no aromaticity.

The term "alkyl group" includes linear, branched or cyclic, monovalent saturated hydrocarbon, unless otherwise specified.

The term "alkylene group" includes linear, branched or cyclic, divalent saturated hydrocarbon, unless otherwise specified. The same applies for the alkyl group within an alkoxy group.

A halogenated alkyl group is an alkyl group in which part or all of the hydrogen atoms thereof have been substituted with halogen atom. Examples of the halogen atom include a fluorine atom, a chlorine atom, a bromine atom and an iodine atom.

A "fluorinated alkyl group" is a group in which part or all of the hydrogen atoms within an alkyl group have been substituted with a fluorine atom.

The term "structural unit" refers to a monomer unit that contributes to the formation of a polymeric compound (resin, polymer, copolymer).

The term "exposure" is used as a general concept that includes irradiation with any form of radiation.

A "structural unit derived from an acrylate ester" refers to a structural unit that is formed by the cleavage of the ethylenic double bond of an acrylate ester.

An "acrylate ester" refers to a compound in which the terminal hydrogen atom of the carboxy group of acrylic acid ($CH_2$=CH—COOH) has been substituted with an organic group.

The acrylate ester may have the hydrogen atom bonded to the carbon atom on the α-position substituted with a substituent. The substituent that substitutes the hydrogen atom bonded to the carbon atom on the α-position is atom other than hydrogen or a group, and examples thereof include an alkyl group of 1 to 5 carbon atoms, a halogenated alkyl group of 1 to 5 carbon atoms and a hydroxyalkyl group. A carbon atom on the α-position of an acrylate ester refers to the carbon atom bonded to the carbonyl group, unless specified otherwise.

Hereafter, an acrylate ester having the hydrogen atom bonded to the carbon atom on the α-position substituted with a substituent is sometimes referred to as "α-substituted acrylate ester". Further, acrylate esters and α-substituted acrylate esters are collectively referred to as "(α-substituted) acrylate ester".

A "structural unit derived from styrene or a styrene derivative" refers to a structural unit that is formed by the cleavage of the ethylenic double bond of styrene or a styrene derivative.

The term "styrene derivative" includes compounds in which the hydrogen atom at the α-position of styrene has been substituted with another substituent such as an alkyl group or a halogenated alkyl group; and derivatives thereof. Examples of the derivatives thereof include styrene which has a substituent other than a hydroxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

As the substituent which substitutes the hydrogen atom on the α-position of hydroxystyrene, the same substituents as those described above for the substituent on the α-position of the aforementioned α-substituted acrylate ester can be mentioned.

The alkyl group which substitutes the hydrogen atom bonded to the carbon atom on the α-position is preferably a linear or branched alkyl group, and specific examples include a methyl group, an ethyl group, a propyl group, an isopropyl group, an n-butyl group, an isobutyl group, a tert-butyl group, a pentyl group, an isopentyl group, and a neopentyl group.

Specific examples of the halogenated alkyl group as the substituent on the α-position include groups in which part or all of the hydrogen atoms of the aforementioned "alkyl group as the substituent on the α-position" are substituted with halogen atoms. Examples of the halogen atom include a fluorine atom, a chlorine atom, a bromine atom and an iodine atom, and a fluorine atom is particularly desirable.

Specific examples of the hydroxyalkyl group as the substituent on the α-position include groups in which part or all of the hydrogen atoms of the aforementioned "alkyl group as the substituent on the α-position" are substituted with a hydroxy group. The number of hydroxy groups within the hydroxyalkyl group is preferably 1 to 5, and most preferably 1.

According to the present invention, there are provided a brush composition which is capable of reducing agglomeration by high temperature baking after being coated on a substrate, and enabling formation of a thin film brush layer; and a method of forming a structure containing a phase-separated structure using the same.

DETAILED DESCRIPTION OF THE INVENTION

<Brush Composition>

Figure 1:
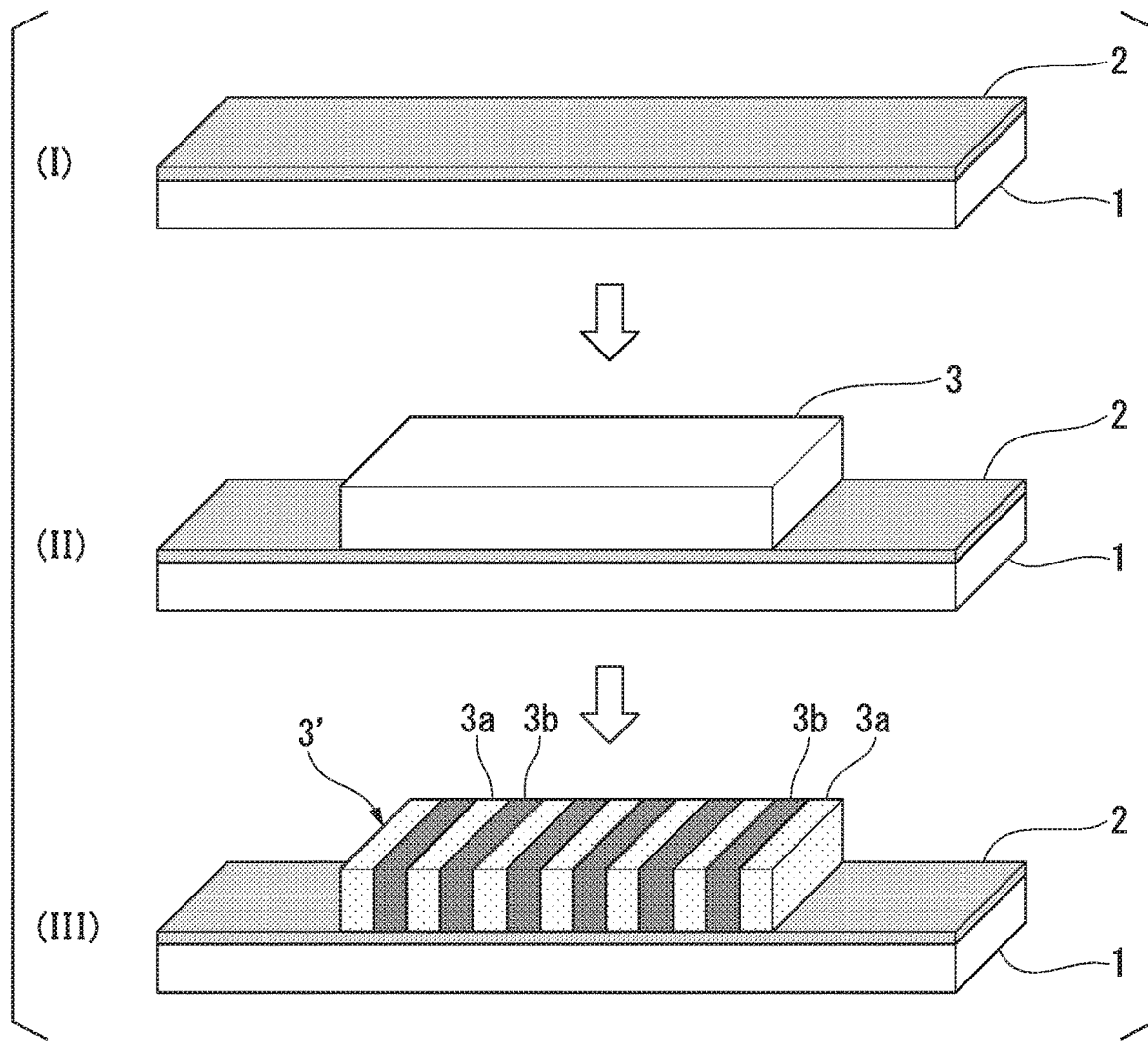
FIG. 1 is a schematic diagram showing an example of one embodiment of the method of forming a structure containing a phase-separated structure according to the present invention.

The brush composition according to a first aspect of the present invention is usable in phase separation of a layer formed on a substrate, the layer containing a block copolymer having a plurality of blocks bonded together.

The brush composition is useful as a surface modifier for a substrate in the formation of a fine structure by directed self assembly (DSA) of a block copolymer. By applying the brush composition on the substrate to form a brush layer, the substrate surface exhibits a high affinity for one of the blocks constituting block copolymer.

The brush composition contains a resin component (hereafter, referred to as "resin component (A)" or "component (A)").

In the present specification, "agglomeration of brush layer" refers to a state where an agglomerate can be confirmed when the brush layer is heated.

(Block Copolymer)

A block copolymer is a polymeric compound in which plurality of partial constitutional components (blocks) in which the same kind of structural unit is repeatedly bonded are bonded. In the present invention, the block copolymer is a polymeric compound in which a hydrophobic polymer block (b11) and a hydrophilic polymer block (b21) bonded together.

The hydrophobic polymer block (b11) (hereafter, referred to simply as "block (b11)") refers to a block in which, when a plurality of monomers having different affinity relative to water are used, a monomer which exhibits relatively low affinity for water among the plurality of monomers is polymerized to form a polymer (hydrophobic polymer) as the block. The hydrophilic polymer block (b21) (hereafter, referred to simply as "block (b21)") refers to a block in which a monomer which exhibits relatively high affinity for water among the plurality of monomers is polymerized to form a polymer (hydrophilic polymer) as the block.

The block (b11) and the block (b21) are not particularly limited as long as long as they are combinations capable of causing phase separation. However, it is preferable to use a combination of blocks which are mutually incompatible.

Further, as the block (b11) and the block (b21), it is preferable to use a combination in which a phase of at least one block amongst the plurality of blocks constituting the block copolymer can be reliably removed as compared to the phases of other blocks.

As the blocks constituting the block copolymer, 2 kinds of blocks may be used, or 3 or more kinds of blocks may be used.

In the present invention, the block copolymer may have a partial constitutional component (block) other than the block (b11) and the block (b21) bonded.

Examples of the block (b11) and the block (b21) include a block in which structural units derived from styrene or a styrene derivative are repeatedly bonded; a block in which structural units derived from an acrylate ester which may have the hydrogen atom bonded to the carbon atom on the α-position substituted with a substituent (structural units derived from (α-substituted) acrylate ester) are repeatedly bonded; a block in which structural units derived from acrylic acid which may have the hydrogen atom bonded to the carbon atom on the α-position substituted with a substituent (structural units derived from (α-substituted) acrylic acid) are repeatedly bonded; a block in which structural units derived from siloxane or a derivative thereof are repeatedly bonded; a block in which structural units derived from an alkyleneoxide are repeatedly bonded; and a block in which silsesquioxane structure-containing structural units are repeatedly bonded.

Examples of styrene derivatives include styrene, styrene in which the hydrogen atom on the α-position has been substituted with an alkyl group or a halogenated alkyl group, or derivatives thereof. Examples of such derivatives include styrene in which the hydrogen atom on the α-position may be substituted and has a substituent bonded to the benzene ring. Examples of the substituent include an alkyl group of 1 to 5 carbon atoms, a halogenated alkyl group of 1 to 5 carbon atoms and a hydroxyalkyl group.

Specific examples of styrene derivatives thereof include α-methylstyrene, 2-methylstyrene, 3-methylstyrene, 4-methylstyrene, 4-t-butylstyrene, 4-n-octylstyrene, 2,4,6-trimethylstyrene, 4-methoxystyrene, 4-t-butoxystyrene, 4-hydroxystyrene, 4-nitrostyrene, 3-nitrostyrene, 4-chlorostyrene, 4-fluorostyrene, 4-acetoxyvinylstyrene, and 4-vinylbenzylchloride.

Examples of (α-substituted) acrylate ester include an acrylate ester in which the hydrogen atom bonded to the carbon atom on the α-position is substituted with a substituent. Examples of the substituent include an alkyl group of 1 to 5 carbon atoms, a halogenated alkyl group of 1 to 5 carbon atoms and a hydroxyalkyl group.

Specific examples of the α-substituted) acrylate ester include acrylate esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate; and methacrylate esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxycyclohexylmethane methacrylate, and propyltrimethoxysilane methacrylate.

Examples of (α-substituted) acrylic acid include acrylic acid in which the hydrogen atom bonded to the carbon atom on the α-position is substituted with a substituent. Examples of the substituent include an alkyl group of 1 to 5 carbon atoms, a halogenated alkyl group of 1 to 5 carbon atoms and a hydroxyalkyl group.

Examples of (α-substituted) acrylic acid include acrylic acid a methacrylic acid.

Examples of siloxane and siloxane derivatives include dimethylsiloxane, diethylsiloxane, diphenylsiloxane, and methylphenylsiloxane.

Examples of the alkylene oxide include ethylene oxide, propylene oxide, isopropylene oxide and butylene oxide.

As the silsesquioxane structure-containing structural unit, polyhedral oligomeric silsesquioxane structure-containing structural unit is preferable. As a monomer which provides a polyhedral oligomeric silsesquioxane structure-containing structural unit, a compound having a polyhedral oligomeric silsesquioxane structure and a polymerizable group can be mentioned.

In the present invention, examples of the block copolymer include a polymeric compound in which a block having structural units derived from styrene or a styrene derivative repeatedly bonded, and a block having structural units derived from an (α-substituted) acrylate ester repeatedly bonded, are bonded together; a polymeric compound in which a block having structural units derived from styrene or a styrene derivative repeatedly bonded, and a block having structural units derived from an (α-substituted) acrylic acid repeatedly bonded, are bonded together; a polymeric compound in which a block having structural units derived from styrene or a styrene derivative repeatedly bonded, and a block having structural units derived from siloxane or a derivative thereof repeatedly bonded, are bonded together; a polymeric compound in which a block having structural units derived from alkyleneoxide repeatedly bonded, and a block having structural units derived from an (α-substituted) acrylate ester repeatedly bonded, are bonded together; a polymeric compound in which a block having structural units derived from alkyleneoxide repeatedly bonded, and a block having structural units derived from an (α-substituted) acrylic acid repeatedly bonded, are bonded together; a polymeric compound in which a block having structural units derived from having a polyhedral oligomeric silsesquioxane structure repeatedly bonded, and a block having structural units derived from an (α-substituted) acrylate ester repeatedly bonded, are bonded together; a polymeric compound in which a block having structural units derived from having a polyhedral oligomeric silsesquioxane structure repeatedly bonded, and a block having structural units derived from (α-substituted) acrylic acid repeatedly bonded, are bonded together; and a polymeric compound in which a block having structural units derived from structural units derived from having a polyhedral oligomeric silsesquioxane structure repeatedly bonded, and a block having structural units derived from siloxane or a derivative thereof repeatedly bonded, are bonded together.

Among these examples, as the block copolymer, a polymeric compound in which a block having structural units derived from styrene or a styrene derivative repeatedly bonded, and a block having structural units derived from an (α-substituted) acrylate ester repeatedly bonded, are bonded together; or a polymeric compound in which a block having structural units derived from styrene or a styrene derivative repeatedly bonded, and a block having structural units derived from an (α-substituted) acrylic acid repeatedly bonded, are bonded together is preferable; a polymeric compound in which a block having structural units derived from styrene or a styrene derivative repeatedly bonded, and a block having structural units derived from an (α-substituted) acrylate ester repeatedly bonded, are bonded together is more preferable; and a polymeric compound in which a block having structural units derived from styrene or a styrene derivative repeatedly bonded, and a block having structural units derived from a (meth)acrylate ester repeatedly bonded, are bonded together is still more preferable.

Specific examples thereof include a polystyrene-polymethyl methacrylate (PS-PMMA) block copolymer, a polystyrene-polyethyl methacrylate block copolymer, a polystyrene-(poly-t-butyl methacrylate) block copolymer, a polystyrene-polymethacrylic acid block copolymer, a polystyrene-polymethyl acrylate block copolymer, a polystyrene-polyethyl acrylate block copolymer, a polystyrene-(poly-t-butyl acrylate) block copolymer, and a polystyrenepolyacrylic acid block copolymer. Among these, a PS-PMMA block copolymer is most preferable.

The weight average molecular weight (Mw) (the polystyrene equivalent value determined by gel permeation chromatography) of each polymer constituting the block copolymer is not particularly limited as long as it is large enough to cause phase separation. The weight average molecular weight is preferably 5,000 to 500,000, more preferably 5,000 to 400,000, and still more preferably 5,000 to 300,000.

The weight average molecular weight (Mw) of the block copolymer is not particularly limited as long as it is large enough to cause phase separation. The weight average molecular weight is preferably 5,000 to 100,000, more preferably 20,000 to 60,000, and still more preferably 30,000 to 50,000.

The polydispersity (Mw/Mn) of the block copolymer is preferably 1.0 to 3.0, more preferably 1.0 to 1.5, and still more preferably 1.0 to 1.2. Here, Mn is the number average molecular weight.

The period of the block copolymer (the length of 1 molecule of the block copolymer) is preferably 5 to 50 nm, more preferably 10 to 40 nm, and still more preferably 20 to 30 nm.

<<Resin Component (A)>>

The resin component (A) contains a polymeric compound in which a first polymer block and a second polymer block are bonded to each other through a linking group containing a substrate adhering group.

[First Polymer Block]

The first polymer block may be a hydrophobic polymer block or a hydrophilic polymer block.

The hydrophobic polymer block (b12) (hereafter, referred to simply as "block (b12)") is a block constituted of a polymer (hydrophobic polymer) obtained by polymerizing a monomer which exhibits relatively low affinity for water as compared to a monomer which provides a structural unit of the hydrophilic polymer block (b21) constituting the block copolymer. The structural unit of the block (b12) and the structural unit of the block (b11) may have the same structure, or different structures. Since the adhesion of the substrate to the layer containing a block copolymer via the brush layer becomes strong, the structural unit of the block (b12) and the structural unit of the block (b11) preferably have the same structure.

The hydrophilic polymer block (b22) (hereafter, referred to simply as "block (b22)") is a block constituted of a polymer (hydrophilic polymer) obtained by polymerizing a monomer which exhibits relatively low affinity for water as compared to a monomer which provides a structural unit of the hydrophobic polymer block (b11) constituting the block copolymer. The structural unit of the block (b22) and the structural unit of the block (b21) may have the same structure, or different structures. Since the adhesion of the substrate to the layer containing a block copolymer via the brush layer becomes strong, the structural unit of the block (b22) and the structural unit of the block (b21) preferably have the same structure.

Examples of the block (b12) and the block (b22) include a block in which structural units derived from styrene or a styrene derivative are repeatedly bonded; a block in which structural units derived from an (α-substituted) acrylate ester are repeatedly bonded; a block in which structural units derived from (α-substituted) acrylic acid are repeatedly bonded; a block in which structural units derived from siloxane or a derivative thereof are repeatedly bonded; a block in which structural units derived from an alkyleneoxide are repeatedly bonded; and a block in which silsesquioxane structure-containing structural units are repeatedly bonded.

Styrene or styrene derivative, the (α-substituted) acrylate ester, the (α-substituted) acrylic acid, siloxane or derivative thereof, the alkyleneoxide and the monomer which provides a silsesquioxane structure-containing structural unit for the block (b12) and the block (b22) are the same as defined for the examples of compounds described for the block (b11) and the block (b21).

As the structural unit of the block (b12), in terms of reliably stabilizing the surface of the brush layer, a structural unit derived from styrene or a styrene derivative is preferable. That is, a structural unit (u1) containing a styrene skeleton which may have a substituent is preferable.

Structural Unit (u1)

The structural unit (u1) is a structural unit containing a styrene skeleton which may have a substituent.

A styrene skeleton having a substituent refers to styrene in which the hydrogen atom on the α-position is substituted and/or part or all of the hydrogen atoms on the benzene ring are substituted with a substituent.

Examples of the substituent for the structural unit (u1) include a halogen atom, or a linear, branched or cyclic hydrocarbon group of 1 to 20 carbon atoms optionally containing an oxygen atom, a halogen atom or a silicon atom, or a combination of the linear, branched or cyclic hydrocarbon group.

With respect to the substituent for the structural unit (u1), examples of the halogen atom include a fluorine atom, a chlorine atom, a bromine atom and an iodine atom. As the halogen atom, a fluorine atom, a chlorine atom or a bromine atom is preferable, and a fluorine atom is more preferable.

The hydrocarbon group as the substituent for the structural unit (u1) has 1 to 20 carbon atoms.

In addition, the hydrocarbon group is a linear, branched or cyclic hydrocarbon group optionally containing an oxygen atom, a halogen atom or a silicon atom, or a combination of the linear, branched or cyclic hydrocarbon group.

Examples of the hydrocarbon group include a linear, branched or cyclic alkyl group, or an aryl group.

The alkyl group as the hydrocarbon group preferably has 1 to 10 carbon atoms, more preferably 1 to 8 carbon atoms, and still more preferably 1 to 6 carbon atoms.

The alkyl group may be a partially or fully halogenated alkyl group (halogenated alkyl group), or an alkyl group in which a carbon atom constituting the alkyl group has been replaced by a silicon atom or an oxygen atom, such as an alkylsilyl group, an alkylsilyloxy group or an alkoxy group.

The "partially halogenated alkyl group" refers to an alkyl group in which part of the hydrogen atoms bonded to the alkyl group are substituted with halogen atom(s) and the "fully halogenated alkyl group" refers to an alkyl group in which all of the hydrogen atoms bonded the alkyl group are substituted with halogen atoms. Examples of the halogen atom include a fluorine atom, chlorine atom, bromine atom and iodine atom, a fluorine atom, a chlorine atom or a bromine atom is preferable, and a fluorine atom is more preferable (that is, a fluorinated alkyl group is preferable).

As the alkylsilyl group, a trialkylsilyl group or a trialkylsilylalkyl group is preferable, and preferable examples thereof include a trimethylsilyl group, a trimethylsilylmethyl group, a trimethylsilylethyl group and a trimethylsilyl-n-propyl group.

As the alkylsilyloxy group, a trialkylsilyloxy group or a trialkylsilyloxyalkyl group is preferable, and preferable examples thereof include a trimethylsilyloxy group, a trimethylsilyloxymethyl group, a trimethylsilyloxyethyl group and a trimethylsilyloxy-n-propyl group.

The alkoxy group preferably has 1 to 10 carbon atoms, more preferably 1 to 8 carbon atoms, and still more preferably 1 to 6 carbon atoms.

The aryl group as the hydrocarbon group has 4 to 20 carbon atoms, preferably 4 to 10 carbon atom, and more preferably 6 to 10 carbon atoms.

Preferable examples of the structural unit (u1) include a structural unit represented by general formula (u1-1) or (u1-2) shown below. In the present embodiment, the structural unit (u1) is preferably a structural unit represented by general formula (u1-1) shown below.

[Chemical Formula 1]

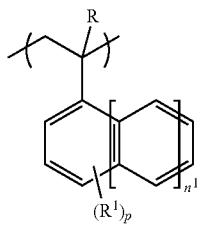

(u1-1)

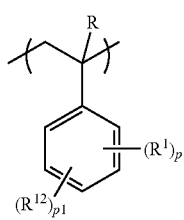

(u1-2)

In the formula, R represents a hydrogen atom, an alkyl group of 1 to 5 carbon atoms or a halogenated alkyl group of 1 to 5 carbon atoms; $R^1$ represents a halogen atom, or a linear, branched or cyclic hydrocarbon group of 1 to 20 carbon atoms optionally containing an oxygen atom, a halogen atom or a silicon atom, or a combination of the linear, branched or cyclic hydrocarbon group; p represents an integer of 0 to 5; n1 represents 0 or 1; $R^{12}$ represents an aromatic hydrocarbon ring which may have a substituent; and p1 represents an integer of 1 to 5.

In general formulae (u1-1) and (u1-2), R represents a hydrogen atom, an alkyl group of 1 to 5 carbon atoms or a halogenated alkyl group of 1 to 5 carbon atoms.

As the alkyl group of 1 to 5 carbon atoms for R, a linear or branched alkyl group of 1 to 5 carbon atoms is preferable, and specific examples thereof include a methyl group, an ethyl group, an n-propyl group, an isopropyl group, an n-butyl group, an isobutyl group, a tert-butyl group, a pentyl group, an isopentyl group and a neopentyl group.

The halogenated alkyl group of 1 to 5 carbon atoms represented by R is a group in which part or all of the hydrogen atoms of the aforementioned alkyl group of 1 to 5 carbon atoms have been substituted with halogen atoms. Examples of the halogen atom include a fluorine atom, a chlorine atom, a bromine atom and an iodine atom, and a fluorine atom is particularly desirable.

As R, a hydrogen atom, an alkyl group of 1 to 5 carbon atoms or a fluorinated alkyl group of 1 to 5 carbon atoms is preferable, a hydrogen atom or an alkyl group of 1 to 5 carbon atoms is more preferable, a hydrogen atom or a methyl group is still more preferable, and a hydrogen atom is most preferable.

In formulae (u1-1) and (u1-2), $R^1$ represents a halogen atom, or a linear, branched or cyclic hydrocarbon group of 1 to 20 carbon atoms optionally containing an oxygen atom, a halogen atom or a silicon atom, or a combination of the linear, branched or cyclic hydrocarbon group.

In the structural unit (u1), by virtue of the benzene ring having $R^1$ bonded thereto as a substituent, the surface free energy of the brush layer is adjusted, and the layer containing a block copolymer to be formed on the brush layer can be satisfactorily phase-separated into a perpendicular cylinder pattern or the like.

In formulae (u1-1) and (u1-2), $R^1$ is the same as defined for the substituent for the structural unit (u1) (a halogen atom, or a linear, branched or cyclic hydrocarbon group of 1 to 20 carbon atoms optionally containing an oxygen atom, a halogen atom or a silicon atom, or a combination of the linear, branched or cyclic hydrocarbon group).

Among these examples, as R', a linear, branched or cyclic hydrocarbon group of 1 to 20 carbon atoms optionally containing an oxygen atom, a halogen atom or a silicon atom, or a combination of the linear, branched or cyclic hydrocarbon group is preferable in that a layer containing a block copolymer to be formed on the brush layer can be satisfactorily phase-separated.

Among these, an alkyl group of 1 to 20 carbon atoms optionally containing an oxygen atom or a halogen atom is preferable, an alkyl group of 1 to 6 carbon atoms, a halogenated alkyl group of 1 to 6 carbon atoms or an alkoxy group of 1 to 6 carbon atoms is more preferable, and an alkyl group of 1 to 6 carbon atoms is most preferable.

The alkyl group for $R^1$ preferably has 1 to 6 carbon atoms, more preferably 3 to 6 carbon atoms, still more preferably 3 or 4 carbon atoms, and most preferably 4 carbon atoms. As the alkyl group for $R^1$, a linear alkyl group or a branched alkyl group is preferable, and preferable examples thereof include a methyl group, an ethyl group, an n-propyl group, an isopropyl group, an n-butyl group, an isobutyl group and a tert-butyl group, more preferably an n-propyl group, an isopropyl group, an n-butyl group, an isobutyl group or a tert-butyl group, still more preferably an n-butyl group, an isobutyl group or a tert-butyl group, and most preferably a tert-butyl group.

Examples of the halogenated alkyl group for $R^1$ include a group in which part or all of the hydrogen atoms of the alkyl group for $R^1$ have been substituted with halogen. As the halogen atom, a fluorine atom is most preferable. The halogenated alkyl group for $R^1$ preferably has 1 to 6 carbon atoms, more preferably 3 to 6 carbon atoms, and still more preferably 3 or 4 carbon atoms.

The alkoxy group for $R^1$ preferably has 1 to 6 carbon atoms, more preferably 1 to 4 carbon atoms, and most preferably 2 carbon atoms. As the alkoxy group for $R^1$, a linear alkoxy group or a branched alkoxy group is preferable, and preferable examples thereof include a methoxy group, an ethoxy group, an isopropoxy group and a t-butoxy group, and an ethoxy group is most preferable.

In formulae (u1-1) and (u1-2), p represents an integer of 0 to 5, preferably an integer of 0 to 3, more preferably an integer of 0 to 2, still more preferably 0 or 1, and most preferably 1.

In formula (u1-2), p1 represents 0 or 1, and preferably 0.

In formula (u1-2), $R^2$ represents an aromatic hydrocarbon ring which may have a substituent. Examples of the aromatic hydrocarbon ring for $R^2$ include benzene, naphthalene, anthracene and phenanthrene. Examples of the substituent for $R^2$ include an alkyl group having 1 to 5 carbon atoms, an alkoxy group having 1 to 5 carbon atoms, a halogenated alkyl group having 1 to 5 carbon atoms, a halogen atom, a trialkylsilyl group, and an alkoxysilyl group.
In formula (u1-2), p1 represents an integer of 1 to 5.
Specific examples of structural units of the block (b12) are shown below. In the formula, $R^\alpha$ represents a hydrogen atom or a methyl group.
[Chemical Formula 2]
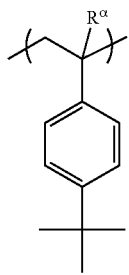
(u1-1-1)
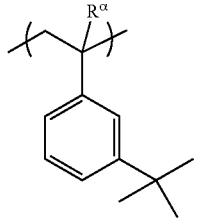
(u1-1-2)
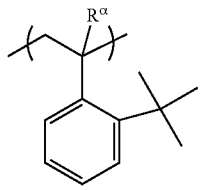
(u1-1-3)
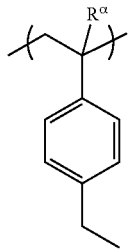
(u1-1-4)
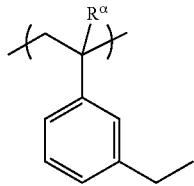
(u1-1-5)
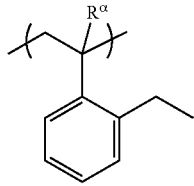
(u1-1-6)
[Chemical Formula 3]
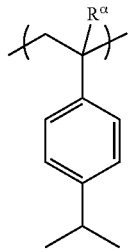
(u1-1-7)
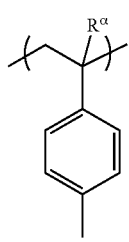
(u1-1-8)
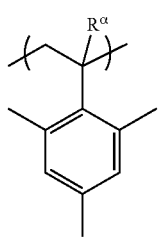
(u1-1-9)
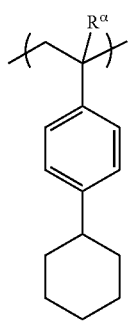
(u1-1-10)
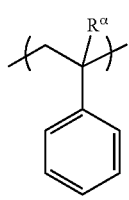
(u1-1-11)
[Chemical Formula 4]
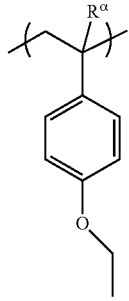
(u1-1-12)

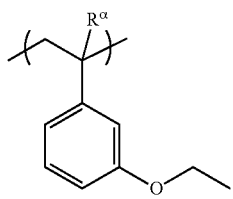 (u1-1-13)
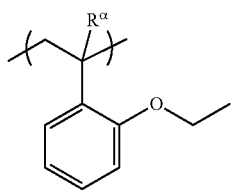 (u1-1-14)
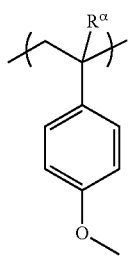 (u1-1-15)
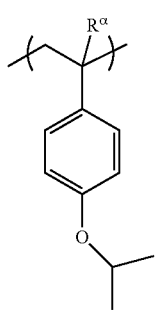 (u1-1-16)
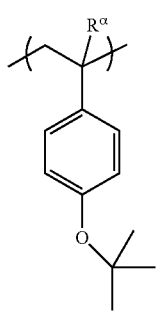 (u1-1-17)
[Chemical Formula 5]
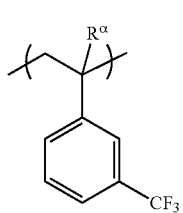 (u1-1-18)
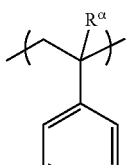 (u1-1-19)
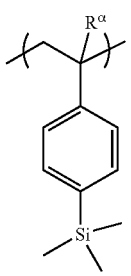 (u1-1-20)
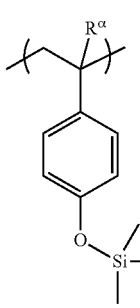 (u1-1-21)
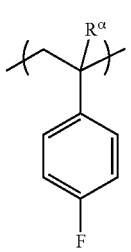 (u1-1-22)
[Chemical Formula 6]
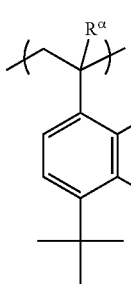 (u1-1-23)
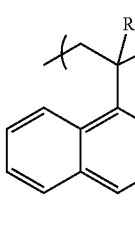 (u1-1-24)

(u1-1-25) 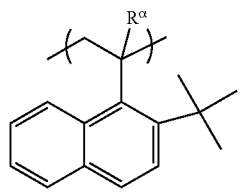
(u1-1-26) 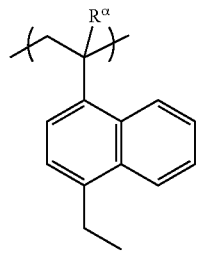
(u1-1-27) 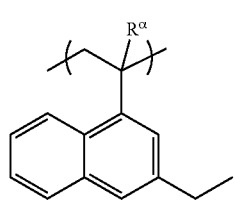
(u1-1-28) 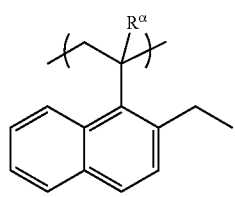
[Chemical Formula 7]
(u1-1-29) 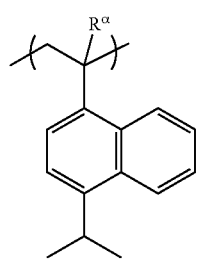
(u1-1-30) 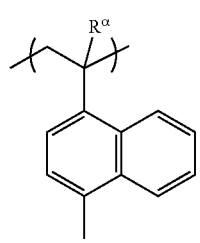
(u1-1-31) 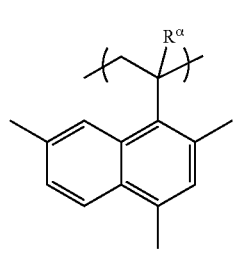
(u1-1-32) 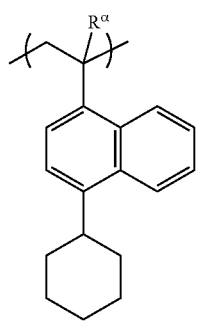
(u1-1-33) 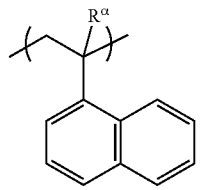
[Chemical Formula 8]
(u1-1-34) 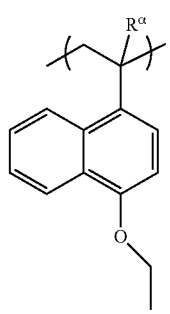
(u1-1-35) 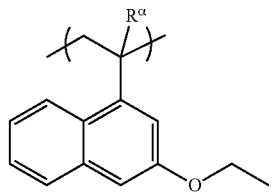
(u1-1-36) 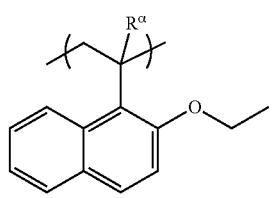
(u1-1-37) 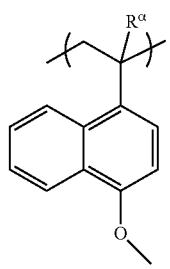

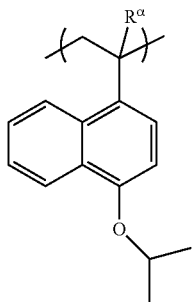 (u1-1-38)
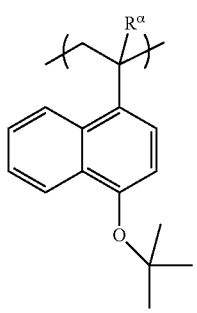 (u1-1-39)
[Chemical Formula 9]
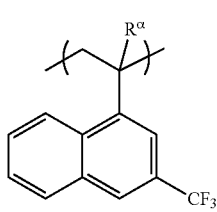 (u1-1-40)
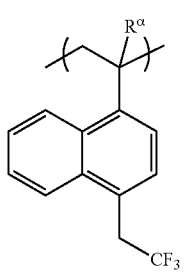 (u1-1-41)
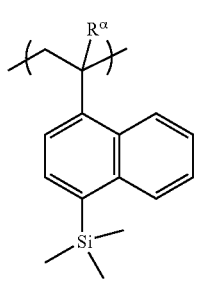 (u1-1-42)
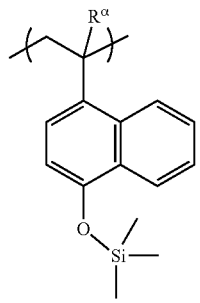 (u1-1-43)
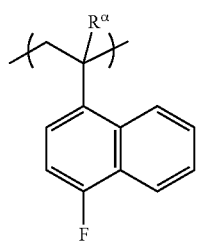 (u1-1-44)
[Chemical Formula 10]
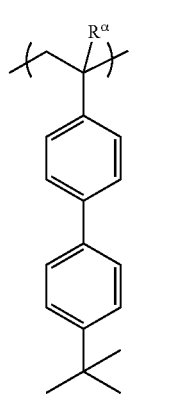 (u1-2-1)
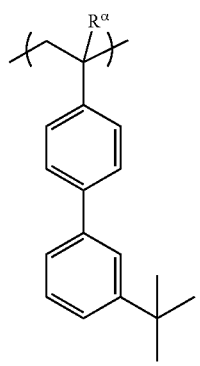 (u1-2-2)
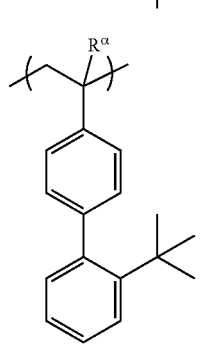 (u1-2-3)

(u1-2-4)
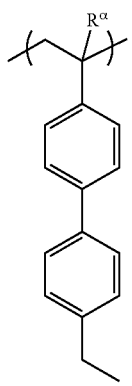
(u1-2-5)
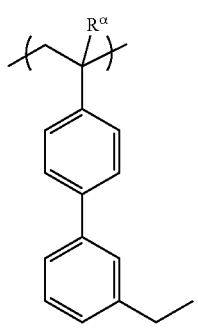
(u1-2-6)
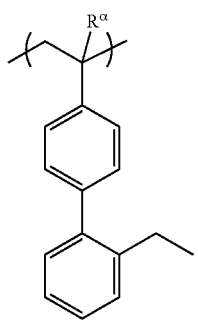
[Chemical Formula 11]
(u1-2-7)
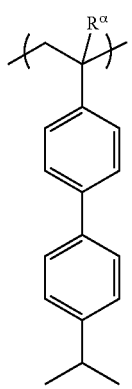
(u1-2-8)
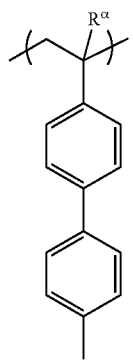
(u1-2-9)
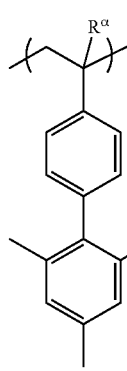
(u1-2-10)
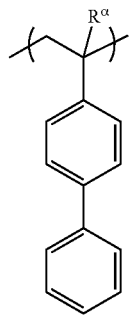
[Chemical Formula 12]
(u1-2-11)
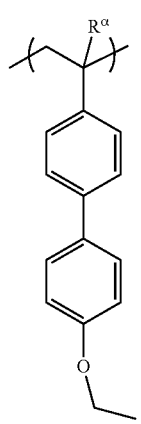

(u1-2-12)
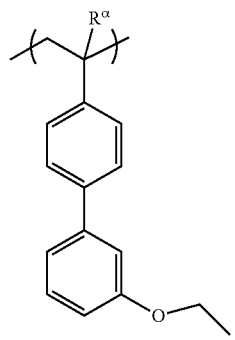
(u1-2-13)
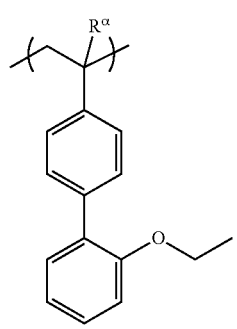
(u1-2-14)
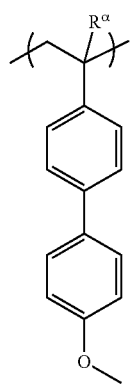
(u1-2-15)
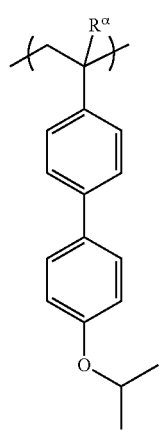
(u1-2-16)
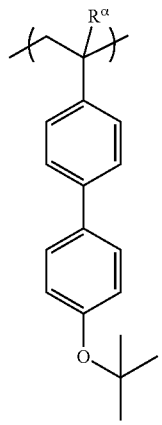
[Chemical Formula 13]
(u1-2-17)
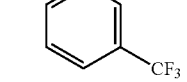
(u1-2-18)
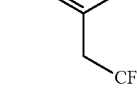
(u1-2-19)
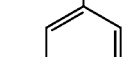

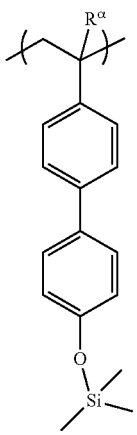

(u1-2-20)

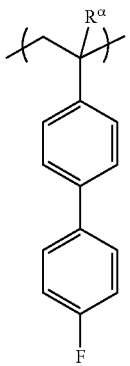

(u1-2-21)

As the structural unit of the block (b12) contained in the component (A), 1 kind of structural unit may be used, or 2 or more kinds of structural units may be used in combination.

The structural unit of the block (b12) preferably includes the structural unit (u1). As the structural unit (u1), at least one member selected from the group consisting of structural units represented by chemical formulae (u1-1-1) to (u1-1-22) is preferable, at least one member selected from the group consisting of structural units represented by chemical formulae (u1-1-1) to (u1-1-14) is more preferable, at least one member selected from the group consisting of structural units represented by chemical formulae (u1-1-1) to (u1-1-11) is still more preferable, at least one member selected from the group consisting of structural units represented by chemical formulae (u1-1-1) to (u1-1-6) and (u1-1-11) is still more preferable, and at least one member selected from the group consisting of structural units represented by chemical formulae (u1-1-1) to (u1-1-3) and (u1-1-11) is most preferable.

In the component (A), the amount of the structural unit of the block (b12) based on the combined total of all structural units constituting the component (A) is preferably 25 mol % or more, more preferably 50 mol % or more, and still more preferably 75 to 100 mol %.

When the amount of the structural unit of the block (b12) is at least as large as the lower limit of the above-mentioned range, the surface of the brush layer becomes more stable, and the layer containing a block copolymer to be formed on the brush layer can be satisfactorily phase-separated.

As the structural unit of the block (b22), in terms of reliably stabilizing the surface of the brush layer, a structural unit derived from an (α-substituted) acrylate ester or a structural unit derived from an (α-substituted) acrylic acid (i.e., structural unit (u2) derived from acrylic acid or an ester thereof which may have the hydrogen atom bonded to the carbon atom on the α-position substituted with a substituent) is preferable.

Structural Unit (u2)

The structural unit (u2) is a structural derived from acrylic acid or an ester thereof which may have the hydrogen atom bonded to the carbon atom on the α>-position substituted with a substituent.

Preferable examples of the structural unit (u2) include a structural unit represented by general formula (u2-1) shown below.

[Chemical Formula 14]

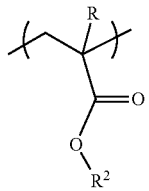

(u2-1)

In the formula, R represents a hydrogen atom, an alkyl group of 1 to 5 carbon atoms or a halogenated alkyl group of 1 to 5 carbon atoms; $R^2$ represents an alkyl group of 1 to 5 carbon atoms, or a linear or branched hydroxyalkyl group of 1 to 20 carbon atoms.

In general formula (u2-1), R represents a hydrogen atom, an alkyl group of 1 to 5 carbon atoms or a halogenated alkyl group of 1 to 5 carbon atoms. In formula (u2-1), R is the same as defined for R in formula (u1-1) above.

As R, a hydrogen atom, an alkyl group of 1 to 5 carbon atoms or a fluorinated alkyl group of 1 to 5 carbon atoms is preferable, a hydrogen atom or an alkyl group of 1 to 5 carbon atoms is more preferable, a hydrogen atom or a methyl group is still more preferable, and a hydrogen atom is most preferable.

In formula (u2-1), $R^2$ represents an alkyl group of 1 to 5 carbon atoms, or a linear or branched hydroxyalkyl group of 1 to 20 carbon atoms.

The hydroxyalkyl group for $R^2$ is an alkyl group having 1 to 20 carbon atoms, preferably 1 to 10 carbon atoms, more preferably 1 to 8 carbon atoms, still more preferably 1 to 6 carbon atoms, and most preferably 1 to 4 carbon atoms, in which part or all of the hydrogen atoms of the alkyl group has been substituted with a hydroxy group. The number of the hydroxy group(s) is preferably 1 to 3, and more preferably 1 or 2.

The hydroxyalkyl group for $R^2$ may be linear or branched.

The alkyl group of 1 to 5 carbon atoms for $R^2$ is preferably a methyl group or an ethyl group, and more preferably a methyl group.

Specific examples of structural units of the block (b22) are shown below. In the formula, $R^\alpha$ represents a hydrogen atom or a methyl group.

[Chemical Formula 15]

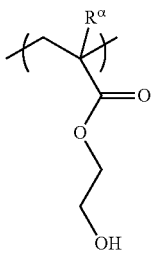
(u2-1-1)

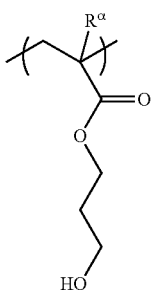
(u2-1-2)

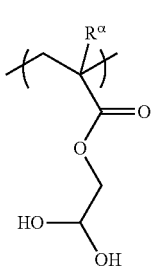
(u2-1-3)

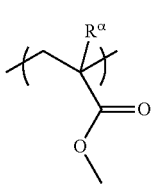
(u2-1-4)

The number average molecular weight (Mn) (the polystyrene equivalent value determined by gel permeation chromatography (GPC)) of the first polymer block is preferably 1,000 to 50,000, more preferably 1,500 to 20,000, and still more preferably 2,000 to 15,000.

[Second Polymer Block]

In the present embodiment, examples of the second polymer block include the hydrophobic polymer block (b12) and the hydrophilic polymer block (b22) described above for the first polymer block.

In the present embodiment, the first polymer block and the second polymer block may be the same or different from each other. In terms of ease in synthesis, the first polymer block and the second polymer block are polymer blocks constituted of the same kind of structural unit.

Further, at least one of the first polymer block and the second polymer block is preferably a structural unit containing a styrene skeleton which may have a substituent. Examples of the structural unit containing a styrene skeleton which may have a substituent include the aforementioned structural unit (u1).

[Substrate Adhering Group]

The resin component (A) contains a polymeric compound in which a first polymer block and a second polymer block are bonded to each other through a linking group containing a substrate adhering group.

As the substrate adhering group, at least one linking group selected from the group consisting of a hydroxy group, a carboxy group, a thiol group, a sulfo group, a phosphonic acid group, an amino group and an amide group is preferable.

<<Production Method of Polymeric Compound (A1)>>

A production method of the polymeric compound (A1) used in the present embodiment will be described.

[Polymer Binder Production Step]

First, a polymer binder used for producing the polymeric compound (A1) is produced.

The polymer binder is produced by reacting a compound containing a substrate adhering group with t-butyldimethylchlorosilane in the presence of imidazole. The reaction formula of the polymer binder production step is shown below.

[Chemical Formula 16]

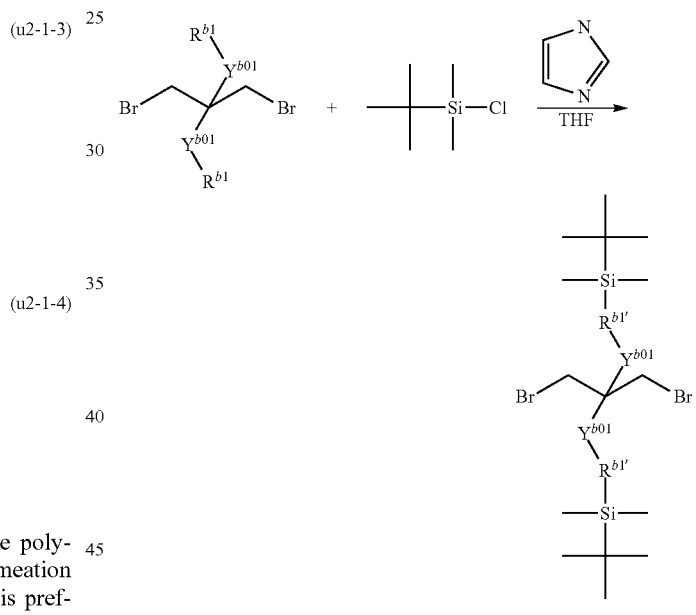

In the reaction formula, each $Y^{b10}$ independently represents a single bond or an alkylene group of 1 to 3 carbon atoms; each $R^{b1}$ independently represents a substrate adhering group; and $R^{b1'}$ represents a group in which one hydrogen atom of the substrate adhering group for $R^{b1}$ has been substituted with t-butyldimethylsilane.

[$Y^{b01}$]

In the reaction formula, each $Y^{b01}$ independently represents a single bond or an alkylene group of 1 to 3 carbon atoms. Examples of the alkylene group for $Y^{b01}$ include a methylene group [—$CH_2$—], an ethylene group [—$(CH_2)_2$—], and a trimethylene group [—$(CH_2)_3$—]. In the present embodiment, a methylene group or an ethylene group is preferable.

[$R^{b1}$]

In the reaction formula, each $R^{b1}$ independently represents a substrate adhering group.

As the substrate adhering group, at least one member selected from the group consisting of a hydroxy group, a carboxy group, a thiol group, a sulfo group, a phosphonic acid group, an amino group and an amide group is preferable.

Among these examples, a hydroxy group, a carboxy group or a thiol group is preferable, and a hydroxy group or a carboxy group is more preferable.

[Polymeric Compound (A1) Precursor Production Step]

Subsequently, using the polymer binder produced above, a precursor of the polymeric compound (A1) is produced.

In the precursor production step, monomers constituting the first polymer block are polymerized to form a polymer.

Here, an example of the production method of the polymeric compound (A1) will be described in the case where the aforementioned structural unit (u1-1) is used.

In the precursor production step, using a polymerization initiator, the structural unit (u1-1) is polymerized. Then, the polymer binder is reacted. The reaction formula of the precursor production step is shown below.

[Chemical Formula 17]

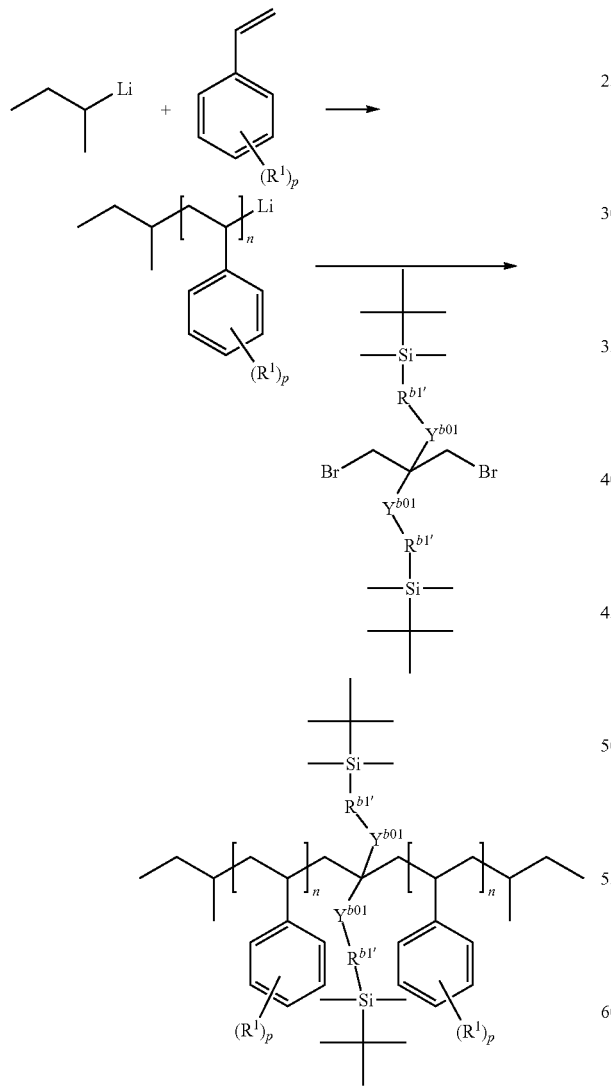

In the reaction formula, each $Y^{b10}$ independently represents a single bond or an alkylene group of 1 to 3 carbon atoms; each $R^{b1}$ independently represents a substrate adhering group; and $R^{b1'}$ represents a group in which one hydrogen atom of the substrate adhering group for $R^{b1}$ has been substituted with t-butyldimethylsilane; $R^1$ a halogen atom, or a linear, branched or cyclic hydrocarbon group or a combination thereof having 1 to 20 carbon atoms which may contain an oxygen atom, a halogen atom or a silicon atom; p represents an integer of 0 to 5; n represents an integer of 1 or more.

In the reaction formula, $Y^{b10}$ and $R^{b1}$ are the same as defined above.

In the reaction formula, $R^1$ and p are the same as defined for $R^1$ and p in the aforementioned general formula (u1-1).

In the reaction example above, n-butyllithium is used as the polymerization initiator.

In the case where anion polymerization is used, examples of other polymerization initiators include organic alkali metals, such ass-butyllithium, t-butyllithium, ethyllithium, ethylsodium, 1,1,-diphenylhexyllithium, 1,1-diphenyl-3-methylpentyllithium.

[Polymer Compound (A1) Production Step]

From the produced precursor, t-butyldimethylsilane is eliminated, to produce the polymeric compound (A1). The reaction formula of the polymeric compound (A1) production step is shown below.

[Chemical Formula 18]

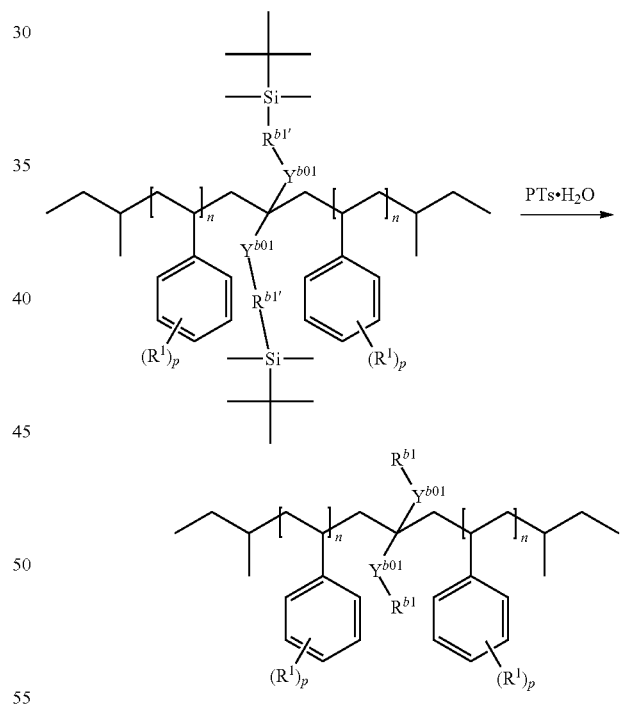

In the reaction formula, each $Y^{b10}$ independently represents a single bond or an alkylene group of 1 to 3 carbon atoms; each $R^{b1}$ independently represents a substrate adhering group; and $R^{b1'}$ represents a group in which one hydrogen atom of the substrate adhering group for $R^{b1}$ has been substituted with t-butyldimethylsilane; $R^1$ a halogen atom, or a linear, branched or cyclic hydrocarbon group or a combination thereof having 1 to 20 carbon atoms which may contain an oxygen atom, a halogen atom or a silicon atom; p represents an integer of 0 to 5; n represents an integer of 1 or more.

In the reaction formula, $Y^{b10}$ and $R^{b1}$ are the same as defined for $Y^{b10}$ and $R^{b1}$ in the aforementioned general formula (Y1).

In the reaction formula, $R^1$ and p are the same as defined for $R^1$ and p in the aforementioned general formula (u1-1).

Examples of the solvent usable in the production of the polymeric compound (A1) include aliphatic hydrocarbons, such as hexane, heptane and octane; ethers, such as diethylether and tetrahydrofuran; ketones, such as acetone, methyl ethyl ketone and methyl amyl ketone; alcohols, such as methanol, ethanol and propanol; aromatic hydrocarbons, such as benzene, toluene and xylene; halogenated alkyls, such as chloroform, bromoform, methylene chloride, methylene bromide and carbon tetrachloride; esters, such as ethyl acetate, butyl acetate, ethyl lactate, propylene glycol monomethyl ether, propylene glycol monomethyl ether acetate and cellosolve; aprotic polar solvents, such as dimethylformamide, dimethylsulfoxide and hexamethylphosphoramide; and water.

The reaction temperature and the reaction time in each step are not particularly limited, and may be appropriately selected depending on, for example, the kind of polymerization initiator to be used.

In the present embodiment, with respect to the linking group containing a substrate adhering group which binds the first polymer block and the second polymer block, the structure of the linking group depends on the chemical structure of the polymer binder.

The linking group containing a substrate adhering group is preferably a linking group represented by general formula (Y1) shown below.

[Chemical Formula 19]

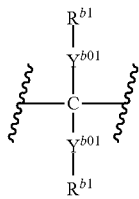

(Y1)

In general formula (Y1), each $Y^{b10}$ independently represents a single bond or an alkylene group of 1 to 3 carbon atoms; each $R^{b1}$ independently represents a substrate adhering group; and the wavy lines indicate valence bond with the first polymer block or the second polymer block.

[$Y^{b01}$]

In general formula (Y1), each $Y^{b01}$ independently represents a single bond or an alkylene group of 1 to 3 carbon atoms. Examples of the alkylene group for $Y^{b01}$ include a methylene group [—$CH_2$—], an ethylene group [—$(CH_2)_2$—], and a trimethylene group [—$(CH_2)_3$—]. In the present embodiment, a methylene group or an ethylene group is preferable, and a methylene group is more preferable.

[$R^{b1}$]

Each $R^{b1}$ independently represents a substrate adhering group.

As the substrate adhering group, at least one member selected from the group consisting of a hydroxy group, a carboxy group, a thiol group, a sulfo group, a phosphonic acid group, an amino group and an amide group is preferable.

Among these examples, a hydroxy group, a carboxy group or a thiol group is preferable, and a hydroxy group or a carboxy group is more preferable.

In the present embodiment, the polymeric compound (A1) is preferably a polymeric compound represented by any of general formulae (A1)-1 to (A1)-4 shown below.

[Chemical Formula 20]

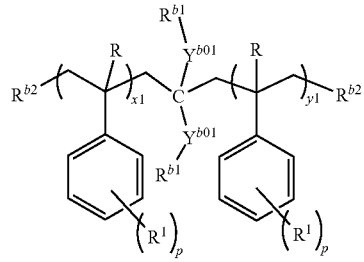

(A1)-1

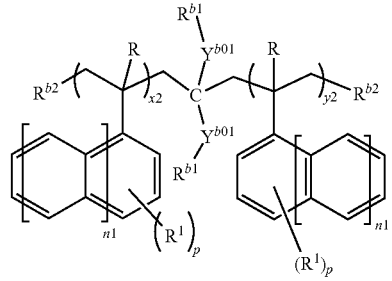

(A1)-2

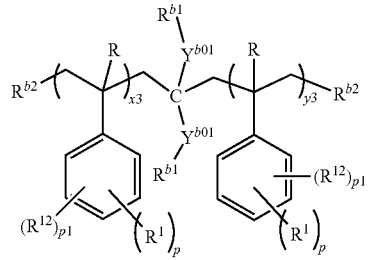

(A1)-3

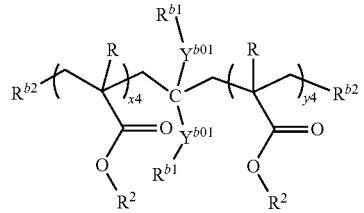

(A1)-4

In general formula (A1)-1, each $Y^{b10}$ independently represents a single bond or an alkylene group of 1 to 3 carbon atoms; each $R^{b1}$ independently represents a substrate adhering group; each $R^{b2}$ independently represents a linear or branched alkyl group having 1 to 10 carbon atoms; R represents a hydrogen atom, an alkyl group having 1 to 5 carbon atoms or a halogenated alkyl group having 1 to 5 carbon atoms; $R^1$ represents a halogen atom, or a linear, branched or cyclic hydrocarbon group or a combination thereof having 1 to 20 carbon atoms which may contain an oxygen atom, a halogen atom or a silicon atom; p represents an integer of 0 to 5; p1 represents an integer of 1 to 5; n1 represents 0 or 1; $R^{12}$ represents an aromatic hydrocarbon ring which may have a substituent; $R^2$ represents an alkyl group of 1 to 5 carbon atoms, or a linear or branched hydroxyalkyl group of 1 to 20 carbon atoms; x1, x2, x3, x4, y1, y2, y3 and y4 each independently represents the repeating number of the structural unit.

In general formulae (A1)-1 to (A1)-4, $Y^{b01}$ and $R^{b1}$ are the same as defined for $Y^{b10}$ and $R^{b1}$ in the aforementioned general formula (Y1), respectively.

In general formula (A1)-1 to (A1)-4, R, $R^1$, $R^{12}$, $R^2$, p, p1 and n1 are the same as defined for R, $R^1$, $R^2$, p, p1 and n1 in the aforementioned general formulae (u1-1), (u1-2) and (u2-1), respectively.

In the present embodiment, among the above examples, a polymeric compound represented by general formula (A1)-1 is more preferable.

[$R^{b2}$]

In general formulae (A1)-1 to (A1)-4, each $R^{b2}$ independently represents a linear or branched alkyl group having 1 to 10 carbon atoms. $R^{b2}$ depends on the chemical structure of the polymerization initiator used.

Specific examples of the polymeric compound (A1) represented by any of (A1)-1 to (A1)-4 are shown below. In the formulae, R, x1, x2, x3, x4, y1, y2, y3 and y4 are the same as defined above.

[Chemical Formula 21]

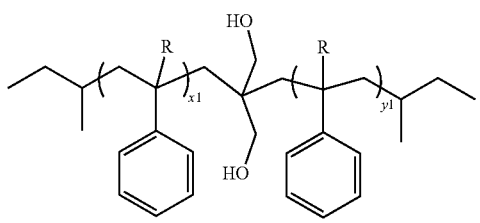

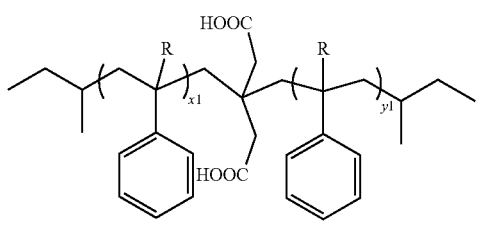

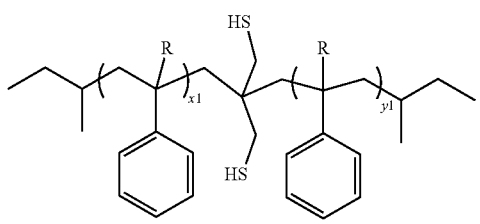

[Chemical Formula 22]

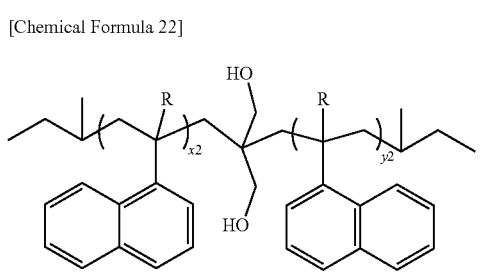

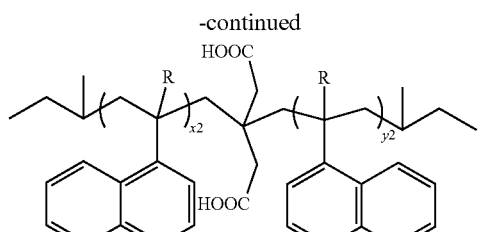

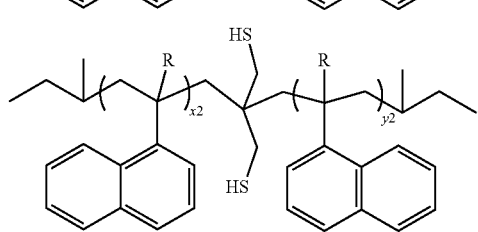

[Chemical Formula 23]

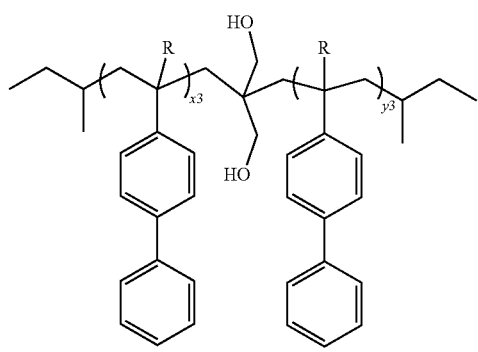

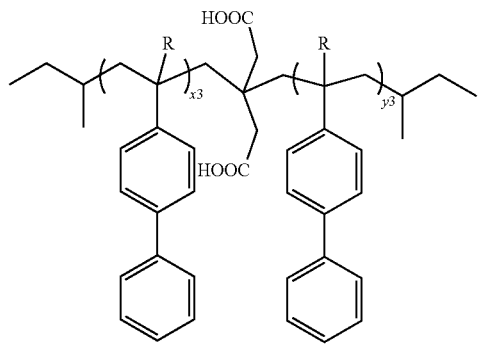

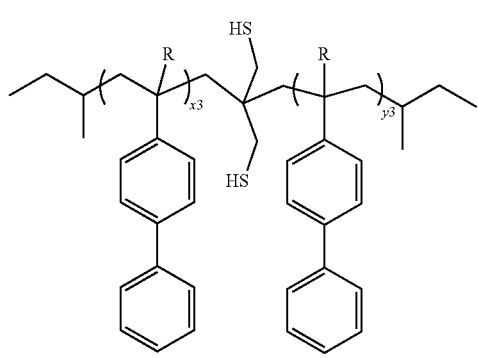

-continued

[Chemical Formula 24]

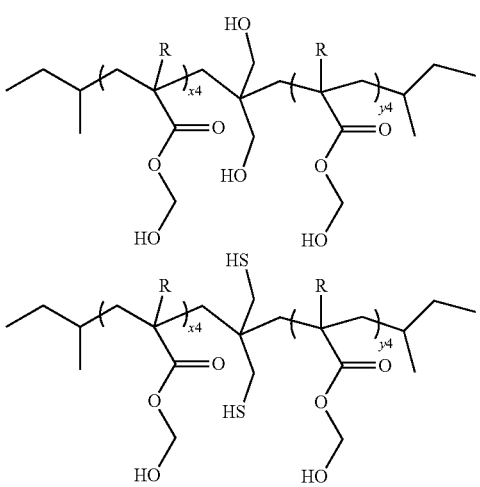

In the brush composition of the present invention, as the component (A), 1 kind of polymeric compound may be used, or 2 or more kinds of polymeric compounds may be used in combination.

The number average molecular weight (Mn) (the polystyrene equivalent value determined by gel permeation chromatography (GPC)) of the component (A) is preferably 2,000 to 100,000, more preferably 2,500 to 150,000, and still more preferably 3,000 to 120,000.

When the weight average molecular weight is no more than the upper limit of the above preferable range, the component (A) satisfactorily dissolves in an organic solvent described later, and the coatability on a substrate becomes excellent. On the other hand, when the number average molecular weight is at least as large as the lower limit of the above-mentioned range, the production stability of the polymeric compound becomes satisfactory.

The molecular weight dispersity (Mw/Mn) of the component (A) is not particularly limited, but is preferably 1.0 to 5.0, more preferably 1.0 to 3.0, and most preferably 1.0 to 2.5. Here, Mn is the number average molecular weight.

In the brush composition of the present invention, the amount of the component (A) can be appropriately adjusted depending on the thickness of the brush layer, and the like.

In the brush composition of the present invention, the amount of the component (A) based on the whole solid content is preferably 70% by weight or more, more preferably 90% by weight or more, and still more preferably 95% by weight or more.

<Optional Components>

The brush composition of the present invention may contain, in addition to the component (A), a component (optional component) other than the component (A).

Acid-Generator Component (B)

The brush composition according to the present embodiment may further include an acid generator component (B) (hereafter, referred to as "component (B)").

The component (B) generates acid by heat or exposure. The component (B) itself does not need to exhibit acidity, may be any compound which is decomposed by heat or light and functions as an acid.

As the component (B), there is no particular limitation, and any of the known acid generator components used in chemically amplified resist compositions conventionally used in photolithography can be used.

Examples of the acid-generator component include a thermal acid generator that generates acid by heating, and a photoacid generator that generates acid upon exposure. Examples of these acid generators are numerous, and include onium salt acid generators such as iodonium salts and sulfonium salts; oxime sulfonate acid generators; diazomethane acid generators such as bisalkyl or bisaryl sulfonyl diazomethanes and poly(bis-sulfonyl)diazomethanes; nitrobenzylsulfonate acid generators; iminosulfonate acid generators; and disulfone acid generators.

A "thermal acid generator which generates acid by heating" refers to a component which generates acid upon heating preferably at 200° C. or lower. When the heating temperature is 200° C. or lower, generation of acid may be reliably controlled. Preferably, a component that generates acid by heating at 50 to 150° C. is used. When the preferable heating temperature is 50° C. or higher, the stability of the acid-generator component in the brush composition becomes satisfactory.

As the onium salt acid generator for the component (B), those in which have at least one anion group selected from a sulfonate anion, a carboxylate anion, a sulfonylimide anion, a bis(alkylsulfonyl)imide anion, a tris(alkylsulfonyl) methide anion and a fluoroantimonic acid ion as the anion moiety is preferable.

In the brush composition of the present invention, as the component (B), 1 kind of acid generator may be used, or 2 or more kinds of acid generators may be used in combination.

When the brush composition contains the component (B), the amount of the component (B) relative to 100 parts by weight of the component (A) is preferably within a range from 0.5 to 30 parts by weight, and more preferably from 1 to 20 parts by weight.

When the amount of the component (B) is within the above range, the effects of the present invention can be satisfactorily achieved.

If desired, other miscible additives can also be added to the brush composition of the present invention, as long as the effects of the present invention are not impaired. Examples of such miscible additives include additive resins for improving the performance of the brush layer, surfactants for improving the applicability, dissolution inhibitors, plasticizers, stabilizers, colorants, halation prevention agents, dyes, sensitizers, base amplifiers and basic compounds (e.g., nitrogen-containing compounds, such as imidazole).

Organic Solvent (S)

The brush composition according to the present embodiment may be produced by dissolving the raw materials including the component (A) and the component (B) and the like if desired, in an organic solvent (hereafter, referred to as "component (S)").

The component (S) may be any organic solvent which can dissolve the respective components to give a uniform solution, and one or more kinds of any organic solvent can be appropriately selected from those which have been conventionally known as solvents for a film composition containing a resin as a main component.

Examples of the component (S) include lactones such as γ-butyrolactone; ketones such as acetone, methyl ethyl ketone, cyclohexanone, methyl-n-pentyl ketone, methyl isopentyl ketone, and 2-heptanone; polyhydric alcohols, such as ethylene glycol, diethylene glycol, propylene glycol and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as a monoalkylether (e.g., monomethylether, monoethylether, monopropylether or monobutylether) or monophenylether of any of these polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

The component (S) can be used individually, or in combination as a mixed solvent.

Among these examples, as the component (S), propylene glycol monomethyl ether acetate (PGMEA), propylene glycol monomethyl ether (PGME), cyclohexanone and ethyl lactate (EL) are preferable.

Further, among the mixed solvents, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, more preferably from 2:8 to 8:2. For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME weight ratio is preferably from 1:9 to 9:1, more preferably from 2:8 to 8:2, and still more preferably 3:7 to 7:3. Alternatively, when PGME and cyclohexanone is mixed as the polar solvent, the PGMEA:(PGME+cyclohexanone) weight ratio is preferably from 1:9 to 9:1, more preferably from 2:8 to 8:2, and still more preferably 3:7 to 7:3.

Further, as the component (S), a mixed solvent of γ-butyrolactone with PGMEA, EL or the aforementioned mixed solvent of PGMEA with a polar solvent, is also preferable. The mixing ratio (former:latter) of such a mixed solvent is preferably from 70:30 to 95:5.

The amount of the component (S) is not particularly limited, and is appropriately adjusted to a concentration which enables coating of a coating solution to a substrate, depending on the thickness of the coating film. In general, the organic solvent is used in an amount such that the solid content of the brush composition becomes within the range from 0.1 to 20% by weight, and preferably from 0.2 to 15% by weight.

The brush composition according to the present embodiment is capable of reducing agglomeration by high temperature baking after being coated on a substrate, and enabling formation of a thin film brush layer. The mechanism of how such effects may be achieved by the brush composition according to the present embodiment will be described with reference to FIG. 3.

Figure 3A:
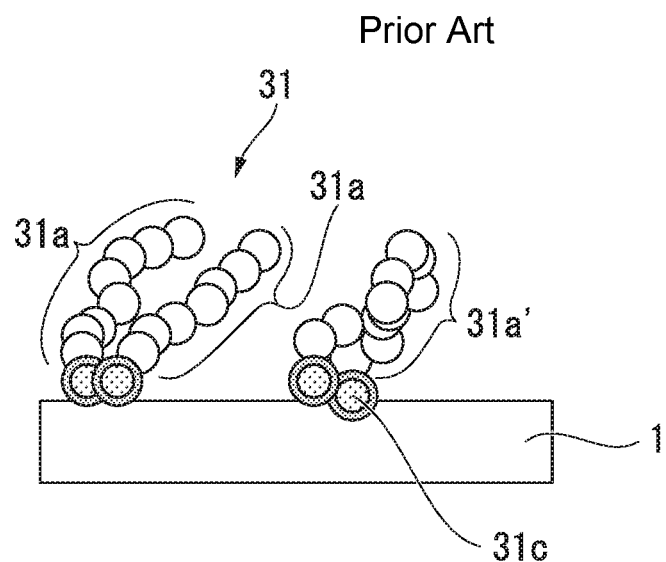
FIG. 3A is a schematic diagram showing the state of a polymeric compound contained in a brush composition adhered to a substrate.
Figure 3B:
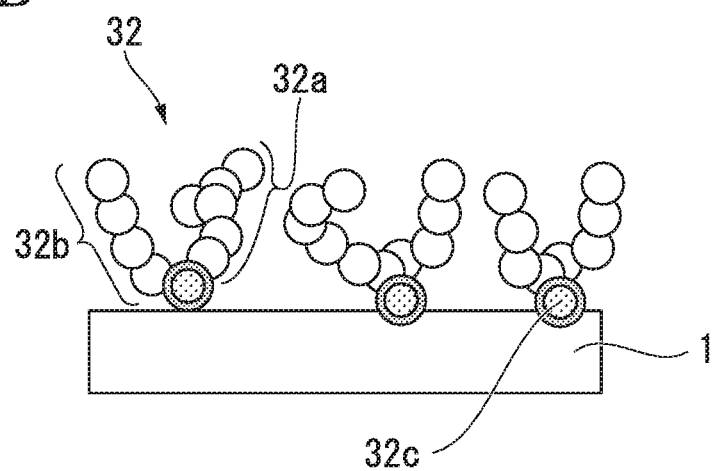
FIG. 3B is a schematic diagram explaining the mechanism of the action of an example of one embodiment according to the present invention.

The case where the present invention is applied by introducing a linking group containing a substrate adhesion group into the main chain of the polymeric compound is shown in FIG. 3B. FIG. 3B is a schematic diagram showing the state of the polymeric compound 32 contained in the brush composition adhered to the substrate 1.

The polymer 32 has the first block 32a and the second block 32b bonded to each other through a linking group containing a substrate adhering group. FIG. 3B shows a state where the substrate adhering group 32c is adsorbed to the substrate 1.

By introducing a linking group containing the substrate adhering group 32c into the main chain of the polymeric compound, the first block 32a and the second block 32b can be arranged on both sides of the linking group containing the substrate adhering group 32c. Therefore, the polymer chain of the polymeric compound 32 may be shortened, and steric hindrance may be suppressed, thereby reducing the film thickness. Further, due to steric hindrance, substrate adhering groups 32 may be suppressed from being bound to each other. As a result, it is presumed that agglomeration may be reduced.

FIG. 3A is a schematic diagram showing the state of the polymeric compound 31 contained in a brush composition adhered to a substrate 1.

FIG. 3A shows the case where the present invention is not applied. In the case where the present invention is not applied, and a polymeric compound 31 in which a substrate adhering group 31c is present at a terminal thereof is used, the substrate adhering groups 31c are adhered to each other, and the polymer chains of the polymeric compound 31 are adhered to each other as shown by the reference 31a'. Further, due to the large length of the polymer chain 31a, the film thickness becomes large.

<Method of Producing Structure Containing Phase-Separated Structure>

A second aspect of the present invention is a method of producing a structure containing a phase-separated structure, the method including: a step of applying the brush composition of the first aspect to form a brush layer (hereafter, referred to as "step (i)"); a step of forming a layer containing a block copolymer on the brush layer, the block copolymer having a plural kinds of block bonded together (hereafter, referred to as "step (ii)"); and a step of phase-separating the layer containing the block copolymer (hereafter, referred to as "step (iii)").

Hereinafter, the method of producing a structure containing a phase-separated structure will be specifically described with reference to FIG. 1. However, the present invention is not limited to these embodiments.

FIG. 1 shows an example of one embodiment of the method of forming a structure containing a phase-separated structure according to the present invention.

Firstly, the brush composition of the present invention is applied to a substrate 1, so as to form a brush layer 2 (FIG. 1 (I); step (i)).

Subsequently, to the brush layer 2 is applied a composition containing a block copolymer having a plurality of blocks bonded (hereafter, sometimes referred to as "BCP composition"), so as to form a layer 3 containing the block copolymer (FIG. 1 (II); step (ii)).

Next, heating is conducted to perform an annealing treatment, so as to phase-separate the layer 3 containing the block copolymer into a phase 3a and a phase 3b (FIG. 1 (III); step (iii)).

According to the production method of the present embodiment, that is, the production method including the steps (i) to (iii), a structure 3' containing a phase-separated structure is formed on the substrate 1 having the brush layer 2 formed thereon.

[Step (i)]

In step (i), the brush composition is applied to a substrate 1, so as to form a brush layer 2.

By forming a brush layer 2 on the substrate 1, the surface of the substrate 1 becomes hydrophobic. By the formation of such brush layer, when a layer 3 containing a block copolymer is formed on the brush layer 2, a phase constituted of a block having a high affinity for the hydrophobic substrate 1 exhibits enhanced adhesion to the substrate 1. As a result, by phase-separation of the layer 3 containing a block copolymer, a cylinder structure oriented perpendicular to the surface of the substrate 1 can be reliably formed.

The kind of the substrate 1 is not particularly limited, as long as a BCP composition can be coated thereon. Examples thereof a substrate constituted of an organic substance, such as a metal (silicon, copper, chromium, iron, aluminum or the like), glass, titanium oxide, silicon dioxide ($SiO_2$), silica or mica; a substrate constituted of a nitride such as SiN; a substrate constituted of an oxynitride such as SiON; and a substrate constituted of an organic substance such as an acrylic resin, polystyrene, cellulose, cellulose acetate or phenol resin. Among these examples, a metal is preferable as the substrate 1. For example, on a silicon substrate (Si substrate), a silicon dioxide substrate ($SiO_2$ substrate) or a copper substrate (Cu substrate), a cylinder structure is formed. Among these, an Si substrate or an $SiO_2$ substrate is particularly desirable. The size and the shape of the substrate 1 is not particularly limited. The substrate 1 does not necessarily need to have a smooth surface, and a substrate having various shapes can be appropriately selected for use. For example, substrates having various shapes can be used, such as a substrate having a curved surface, a plate having an uneven surface, and a thin sheet.

On the surface of the substrate 1, an inorganic and/or organic film may be provided.

As the inorganic film, an inorganic antireflection film (inorganic BARC) can be used. As the organic film, an organic antireflection film (organic BARC) can be used.

An inorganic film can be formed, for example, by coating an in organic anti-reflection film composition such as a silicon-based material on a substrate, followed by baking.

An organic film can be formed, for example, by dissolving a resin component and the like for forming the film in an organic solvent to obtain an organic film-forming material, coating the organic film-forming material on a substrate using a spinner or the like, and baking under heating conditions preferably in the range of 200 to 300° C. for 30 to 300 seconds, more preferably for 60 to 180 seconds. The organic film-forming material does not need to have susceptibility to light or electron beam like a resist film, and the organic film-forming material may or may not have such susceptibility. More specifically, a resist or a resin generally used in the production of a semiconductor device or a liquid crystal display device can be used.

Further, it is preferable that the organic film-forming material can be subjected to etching using a block copolymer pattern formed by processing the layer 3, particularly dry etching, so that, by etching the organic film using a pattern of a block copolymer, the pattern can be transferred to the organic film, and an organic film pattern can be formed. It is particularly desirable to use an organic film-forming material which can be subjected to oxygen plasma etching or the like. As such an organic film-forming material, a material conventionally used for forming an organic film such as an organic BARC can be used. Examples of such an organic film-forming material include the ARC series manufactured by NISSAN CHEMICAL INDUSTRIES, LTD., the AR series manufactured by Rohm and Haas Company, and the SWK series manufactured by Tokyo Ohka Kogyo Co., Ltd.

The method of applying the brush composition of the present invention to the substrate 1 to form a brush layer 2 is not particularly limited, and the brush layer 2 can be formed by a conventional method.

For example, the brush composition can be applied to the substrate 1 by a conventional method using a spinner or the like to form a coating film on the substrate 1, followed by drying, thereby forming a brush layer 2.

The drying method of the coating film is not particularly limited, provided it can volatilize the solvent contained in the brush composition, and a baking method and the like are exemplified. The baking temperature is preferably 80° C. to 300° C., more preferably 180° C. to 270° C., and still more preferably 220° C. to 250° C. The baking time is preferably 30 seconds to 500 seconds, and more preferably 60 seconds to 400 seconds.

The thickness of the brush layer 2 after drying of the coating film is preferably about 10 to 100 nm, and more preferably about 40 to 90 nm.

Before forming the brush layer 2 on the substrate 1, the surface of the substrate 1 may be cleaned in advance. By cleaning the surface of the substrate 1, the coatability of the brush composition is improved.

As the cleaning treatment, a conventional method may be used, and examples thereof include an oxygen plasma treatment, an ozone oxidation treatment, an acid alkali treatment, and a chemical modification treatment.

After forming the brush layer 2, if necessary, the brush layer 2 may be rinsed using a rinse liquid such as a solvent. By the rinsing, uncrosslinked portions within the brush layer 2 are removed, such that the affinity of the substrate for at least 1 polymer (block) constituting the block copolymer is improved, and a phase-separated structure having a cylinder structure oriented in a direction perpendicular to the surface of the substrate 1 can be reliably formed.

The rinse liquid may be any liquid capable of dissolving the uncrosslinked portions, and a solvent such as propylene glycol monomethylether acetate (PGMEA), propylene glycol monomethylether (PGME), or ethyl lactate (EL), or a commercially available thinner can be used.

After the rinsing, for volatilizing the rinse liquid, a post bake may be conducted. The temperature conditions for the post bake is preferably from 80 to 300° C., more preferably from 100 to 270° C., and still more preferably 120 to 250° C. The baking time is preferably 30 seconds to 500 seconds, and more preferably 60 seconds to 240 seconds. The thickness of the brush layer 2 after the post bake is preferably about 1 to 10 nm, and more preferably about 2 to 7 nm.

[Step (ii)]

In step (ii), on the brush layer 2, a layer 3 containing a block copolymer having a plurality of blocks bonded is formed.

The method of forming the layer 3 on the brush layer 2 is not particularly limited, and examples thereof include a method in which a BCP composition is applied to the brush layer 2 by a conventional method using spincoating or a spinner, followed by drying. The details of the BCP composition will be described later.

The layer 3 may have a thickness satisfactory for phase-separation to occur. In consideration of the kind of the substrate 1, the structure period size of the phase-separated structure to be formed, and the uniformity of the nanostructure, the thickness is preferably 20 to 100 nm, and more preferably 30 to 80 nm.

For example, in the case where the substrate 1 is an Si substrate or an $SiO_2$, the thickness of the layer 3 is preferably 20 to 100 nm, and more preferably 30 to 80 nm.

In the case where the substrate 1 is a Cu substrate, the thickness of the layer 3 is preferably 10 to 100 nm, and more preferably 30 to 80 nm.

[Step (iii)]

Step (iii), the layer 3 containing a block copolymer is phase-separated.

By heating the substrate 1 after step (ii) to conduct the anneal treatment, the block copolymer is selectively removed, such that a phase-separated structure in which at least part of the surface of the substrate 1 is exposed is formed. That is, on the substrate 1, a structure 3' containing a phase-separated structure in which phase 3a and phase 3b are phase separated is produced.

The anneal treatment is preferably conducted at a temperature at least as high as the glass transition temperature of the block copolymer used and lower than the heat decomposition temperature. For example, in the case where the block copolymer is a polystyrene-polymethacrylate (PS-PMMA) block copolymer (weight average molecular weight: 5,000 to 100,000), 180 to 270° C. is preferable. The heating time is preferably 30 to 3,600 seconds.

Further, the anneal treatment is preferably conducted in a low reactive gas such as nitrogen.

By the method of producing a structure containing a phase-separated structure according to the present invention described heretofore, the phase-separation performance of the block copolymer can be enhanced, and a fine structure with a good shape can be formed, as compared to conventional lithography techniques. In addition, on the surface of the substrate, a substrate provided with a nanostructure which has the position and the orientation designed more freely can be produced. For example, the formed structure has high adhesion to the substrate, and is likely to have a phase-separated structure with a cylinder structure oriented in a direction perpendicular to the surface of the substrate.

[Optional Step]

The method of forming a structure containing a phase-separated structure according to the present invention is not limited to the above embodiment, and may include a step (optional step) other than steps (i) to (iii).

Examples of the optional steps include a step of selectively removing a phase constituted of at least one block of the plurality of blocks constituting the block copolymer contained in the layer containing the block copolymer (hereafter, referred to as "step (iv)"), and a guide pattern formation step.

Step (iv)

In step (iv), from the layer containing a block copolymer formed on the brush layer, a phase constituted of at least one block of the plurality of blocks constituting the block copolymer is selectively removed. In this manner, a fine pattern (polymeric nanostructure) can be formed.

Examples of the method of selectively removing a phase constituted of a block include a method in which an oxygen plasma treatment or a hydrogen plasma treatment is conducted on the layer containing a block copolymer.

Hereafter, among the blocks constituting the block copolymer, a block which is not selectively removed is referred to as "block $P_A$", and a block to be selectively removed is referred to as "block $P_B$". For example, after the phase separation of a layer containing a PS-PMMA block copolymer, by subjecting the layer to an oxygen plasma treatment or a hydrogen plasma treatment, the phase of PMMA is selectively removed. In such a case, the PS portion is the block $P_A$, and the PMMA portion is the block $P_B$.

Figure 2:
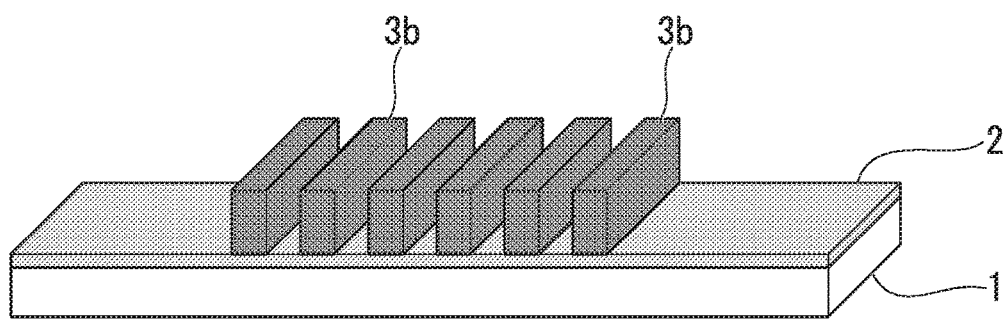
FIG. 2 is an explanatory diagram showing an example of one embodiment of an optional step.

FIG. 2 shows an example of one embodiment of step (iv).

In the embodiment shown in FIG. 2, by conducting oxygen plasma treatment on the structure 3' produced on the substrate 1 in step (iii), the phase 3a is selectively removed, and a pattern (polymeric nanostructure) constituted of phases 3b separated from each other is formed. In this case, the phase 3b is the phase constituted of the block $P_A$, and the phase 3a is the phase constituted of the block $P_B$.

The substrate 1 having a pattern formed by phase-separation of the layer 3 containing the block copolymer as described above may be used as it is, or may be further heated to modify the shape of the pattern (polymeric nanostructure) on the substrate 1.

The heat treatment is preferably conducted at a temperature at least as high as the glass transition temperature of the block copolymer used and lower than the heat decomposition temperature. Further, the heating is preferably conducted in a low reactive gas such as nitrogen.

Guide Pattern Forming Step

In the method of forming a structure containing a phase-separated structure according to the present invention, between step (i) and step (ii), a step of forming a guide pattern on the brush layer (guide pattern forming step) may be included. In this manner, it becomes possible to control the arrangement of the phase-separated structure.

For example, in the case of a block copolymer where a random fingerprint-patterned phase separation structure is formed without using a guide pattern, by providing a trench pattern of a resist film on the surface of the brush layer, a phase separation structure arranged along the trench can be obtained. The guide pattern can be provided on the brush layer 2 in accordance with the above-described principle. Further, when the surface of the guide pattern has affinity for any of the polymers constituting the block copolymer, a phase separation structure having a cylinder structure arranged in the perpendicular direction of the surface of the substrate can be more reliably formed.

The guide pattern can be formed, for example, using a resist composition.

The resist composition for forming the guide pattern can be appropriately selected from resist compositions or a modified product thereof typically used for forming a resist pattern which have affinity for any of the polymers constituting the block copolymer. The resist composition may be either a positive resist composition capable of forming a positive pattern in which exposed portions of the resist film are dissolved and removed, or a negative resist pattern capable of forming a negative pattern in which unexposed portions of the resist film are dissolved and removed, but a negative resist composition is preferable. As the negative resist composition, for example, a resist composition containing an acid generator and a base component which exhibits decreased solubility in an organic solvent-containing developing solution under action of acid, wherein the base component contains a resin component having a structural unit which is decomposed by action of acid to exhibit increased polarity, is preferable.

When the BCP composition is cast onto the brush layer having the guide pattern formed thereon, an anneal treatment is conducted to cause phase-separation. Therefore, the resist pattern for forming a guide pattern is preferably capable of forming a resist film which exhibits solvent resistance and heat resistance.

Composition Containing a Block Copolymer (BCP Composition)

As the BCP composition, a composition obtained by dissolving a block copolymer in an organic solvent can be mentioned.

Organic Solvent

A BCP composition can be prepared by dissolving the above block copolymer in an organic development. The organic solvent is the same as defined for the organic solvent usable for the brush composition.

The amount of the organic solvent in the BCP composition is not particularly limited, and is adjusted appropriately to a concentration that enables application of a coating solution depending on the thickness of the coating film. In general, the organic solvent is used in an amount that yields a solid content for the block copolymer that is within a range from 0.2 to 70% by weight, and preferably from 0.2 to 50% by weight.

If desired, in addition to the block copolymer and the organic solvent, other miscible additives can also be added to the BCP composition. Examples of such miscible additives include additive resins for improving the performance of the layer of the brush layer, surfactants for improving the applicability, dissolution inhibitors, plasticizers, stabilizers, colorants, halation prevention agents, dyes, sensitizers, base amplifiers and basic compounds.

EXAMPLES

As follows is a description of examples of the present invention, although the scope of the present invention is by no way limited by these examples.

In the chemical formulae, "n" represents the repeating number of the structural unit.

Synthesis Example of Polymeric Compound

Synthesis of Polymer Binder

A 100 ml three-necked flask was equipped with a thermometer and a dropping funnel. In a nitrogen atmosphere, 5 g of 2,2-bis(bromomethyl)-1,3-propanediol, 25 g of tetrahydrofuran (hereafter, referred to as "THF") and 13 g of imidazole were added to the three-necked flask, and cooled to a temperature of no more than 10° C.

Then, 6.33 g of t-butyldimethylchlorosilane dissolved in 25 g of THF was dropwise added while maintaining the temperature at no more than 10° C., and stirring was conducted for 30 minutes, followed by reacting at room temperature for 10 hours.

Subsequently, 25 g of ultrapure water was added, followed by extraction with 100 g of dichloromethane, and washing of the organic phase with 50 g of ultrapure water 5 times. The washed organic phase was concentrated and solidified, so as to obtain 7.85 g of a polymer binder as an objective compound with a yield of 81%. The reaction scheme is shown below.

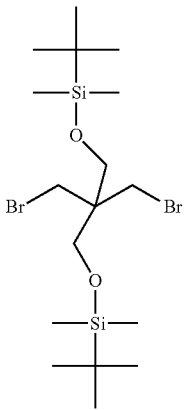

Polymer binder

<<Synthesis of Precursor>>

0.77 g of lithium chloride was added to a 300 ml Schlenk flask which had been dried, 228 g of a low oxygen/low water grade THF was added in an argon atmosphere, followed by cooling to −78° C.

Then, 1.64 g of a 1M cyclohexane solution of sec-butyllithium and 11.9 g of styrene which had been dehydrated and degassed were injected by a syringe, and a reaction was conducted for 30 minutes.

Subsequently, 0.44 g of the polymer binder which had been degassed was injected by a syringe, and a reaction was conducted for 60 minutes.

After raising the temperature of the reaction liquid to room temperature, the reaction liquid was diluted with 115 g of concentrated tert-butyl methyl ether, and the organic phase was washed 3 times with 115 g of a 1% hydrochloric acid solution and 4 times with 115 g of ultrapure water. The washed organic phase was concentrated and solidified, so as to obtain 11.0 g of a precursor (PS2-TBS) as an objective compound with a yield of 96%. The reaction scheme is shown below. As a result of GPC analysis, the obtained PS2-TBS had Mn of 11,000, and Mw/Mn of 1.15.

[Chemical Formula 25]

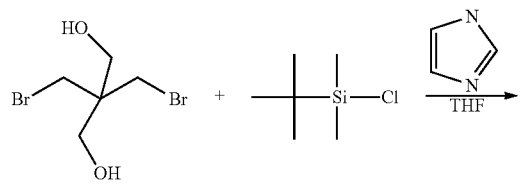

[Chemical Formula 26]

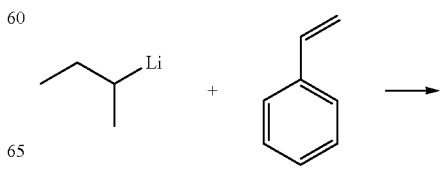

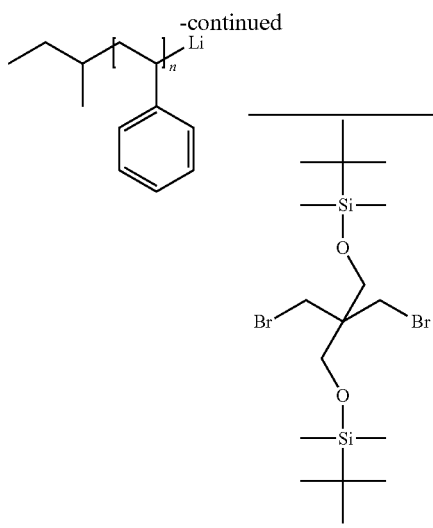

PS2-TBS

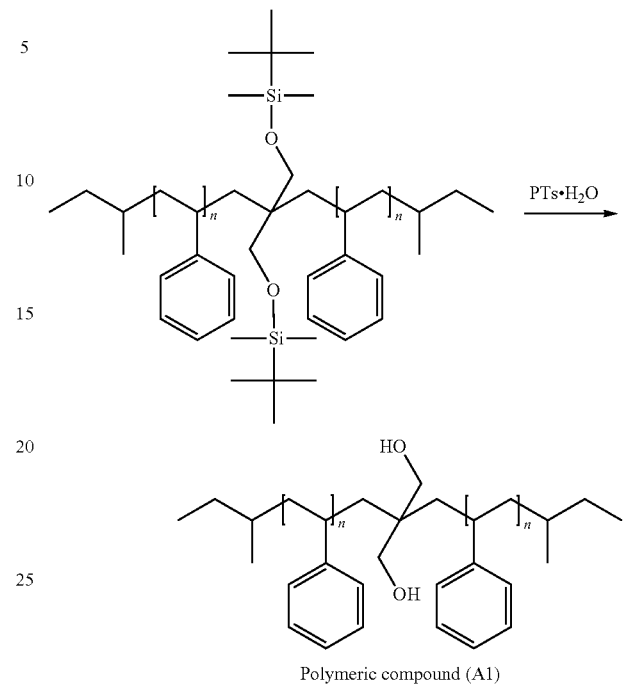

Polymeric compound (A1)

Preparation of Brush Composition

Example 1, Comparative Examples 1 and 2

Each of the polymeric compound (A1), polymeric compounds (A2) and (A3) shown below was dissolved in propylene glycol monomethyl ether acetate to obtain a brush composition (solid content: 1.20 wt %) for each example.

TABLE 1

|  | Resin component (A) | Organic solvent (S) |
| --- | --- | --- |
| Example 1 | (A)-1 [100] | (S)-1 [8230] |
| Comparative Example 1 | (A)-2 [100] | (S)-1 [8230] |
| Comparative Example 2 | (A)-3 [100] | (S)-1 [8230] |

In Table 1, the reference characters indicate the following. The values in brackets [ ] indicate the amount (in terms of parts by weight) of the component added.

(A)-1: the aforementioned polymeric compound (A1)

(A)-2: Polymeric compound (A2) shown below (A)-3: Polymeric compound (A3) shown below (S)-1: propyleneglycol monomethyletheracetate (PG-MEA).

<Synthesis of Polymeric Compound (A1)>

To a three-necked flask equipped with a thermometer and a cooling pipe was added 6.88 g of the obtained precursor, 56.3 g of dichloromethane and 3.56 g of p-toluenesulfonic acid monohydrate, followed by stirring at 40° C. for 10 hours.

The reaction liquid was cooled to room temperature, followed by filtration and collecting the filtrate.

Subsequently, the organic phase was washed 3 times with 70.7 g of a 1% hydrochloric acid solution and 4 times with 70.7 g of ultrapure water. The organic phase after the washing was concentrated and solidified, so as to obtain 3.58 g of the objective polymeric compound (polymeric compound A1) with an yield of 80%. The reaction scheme is shown below. As a result of GPC analysis, the obtained polymeric compound (A1) had Mn of 11,000, and Mw/Mn of 1.15.

[Chemical Formula 28]

Polymeric compound (A2)

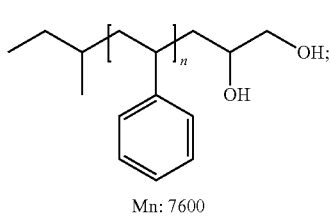

Mn: 7600

Polymeric compound (A3)

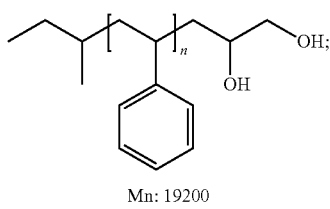

Mn: 19200

<Formation of Brush Layer>

Each of the brush compositions shown in Table 1 was applied to an 8-inch silicon (Si) wafer using a spinner, followed by baking and drying at 280° C. for 60 seconds, so as to form a brush layer having a film thickness of 50 nm. The occurrence of agglomeration was confirmed by visual observation.

The brush layer was rinsed with OK73 thinner (product name; manufactured by Tokyo Ohka Kogyo Co., Ltd.), so as to remove the uncrosslinked portions and the like of the random copolymer. Then, baking was conducted at 250° C. for 60 seconds. thereafter, the film thickness and water contact angle of the brush layer were measured.

[Confirmation of Agglomeration]

Occurrence of agglomeration of the brush layer was confirmed by visual observation. The criteria is as follows. The results are shown in Table 2.

A: Agglomeration was hardly observed
B: Agglomeration was partially observed
C: Agglomeration was observed

[Water Contact Angle on the Surface of the Brush Layer]

A water droplet was dripped onto the surface of the brush layer, and DROP MASTER-700 apparatus (a product name, manufactured by Kyowa Interface Science Co. Ltd.) was used to measure the contact angle (static contact angle) (contact:angle measurement: water 2 μL). The measured value is indicated under "contact angle (°)" in Table 2.

TABLE 2

|  | Agglomeration | Film thickness (nm) | Contact angle (°) |
|---|---|---|---|
| Example 1 | A | 2.53 | 89.7 |
| Comparative Example 1 | C | 5.98 | 90.4 |
| Comparative Example 2 | B | 8.20 | 88.3 |

As seen from the results shown above, in Example 1 in which the present invention was applied, agglomeration of the brush layer was hardly observed, the film thickness was small, and the water contact angle was large.

On the other hand, in Comparative Example 1 in which the present invention was not applied, although the water contact angle was large, the brush layer was agglomerated. Further, in Comparative Example 2, although agglomeration of the brush layer was partially suppressed, the film thickness was large.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of producing a structure containing a phase-separated structure, the method comprising:
   applying a brush composition to a substrate to form a brush layer;
   forming a layer containing a block copolymer on the brush layer; and
   phase-separating the layer containing the block copolymer,
   wherein the brush composition comprises:
   a resin component (A) comprising a polymeric compound (A1) in which a first polymer block and a second polymer block are bonded to each other through a linking group represented by general formula (Y1) shown below:

(Y1)

wherein each $Y^{b01}$ independently represents a single bond or an alkylene group of 1 to 3 carbon atoms; each $R^{b1}$ independently represents a substrate adhering group; and the wavy lines indicate valence bond with the first polymer block or the second polymer block.

2. The method according to claim 1, wherein the polymeric compound (A1) has a number average molecular weight of 2,000 to 100,000.

3. The method according to claim 2, wherein the first polymer block has a number average molecular weight of 1,000 to 50,000.

4. The method according to claim 1, wherein at least one of the first polymer block and the second polymer block comprises a structural unit containing a styrene skeleton which may have a substituent.

5. The method according to claim 1, wherein the substrate adhering group is at least one member selected from the group consisting of a hydroxy group, a carboxy group, a thiol group, a sulfo group, a phosphonic acid group, an amino group and an amide group.

6. The method according to claim 1, wherein the polymeric compound is represented by any one of general formulae (A1)-1 to (A1)-4 shown below:

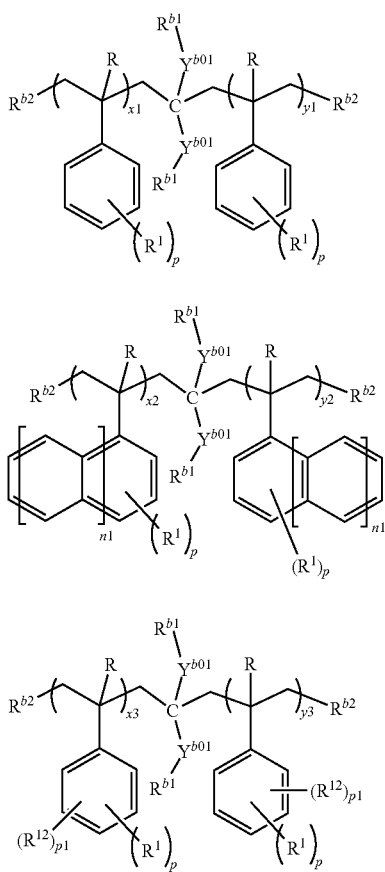

(A1)-1

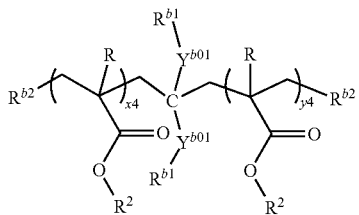

(A1)-2

(A1)-3

-continued (A1)-4 wherein each $Y^{b01}$ independently represents a single bond or an alkylene group of 1 to 3 carbon atoms; each $R^{b1}$ independently represents a substrate adhering group; each $R^{b2}$ independently represents a linear or branched alkyl group having 1 to 10 carbon atoms; R represents a hydrogen atom, an alkyl group having 1 to 5 carbon atoms or a halogenated alkyl group having 1 to 5 carbon atoms; $R^1$ represents a halogen atom, or a linear, branched or cyclic hydrocarbon group or a combination thereof having 1 to 20 carbon atoms which may contain an oxygen atom, a halogen atom or a silicon atom; p represents an integer of 0 to 5; p1 represents an integer of 1 to 5; n1 represents 0 or 1; $R^{12}$ represents an aromatic hydrocarbon ring which may have a substituent; $R^2$ represents an alkyl group of 1 to 5 carbon atoms, or a linear or branched hydroxyalkyl group of 1 to 20 carbon atoms; x1, x2, x3, x4, y1, y2, y3 and y4 each independently represents the repeating number of the structural unit.

7. The method according to claim 6, wherein the substrate adhering group is at least one member selected from the group consisting of a hydroxy group, a carboxy group, a thiol group, a sulfo group, a phosphonic acid group, an amino group and an amide group.

* * * * *